US012777151B2

(12) United States Patent
Lim

(10) Patent No.: US 12,777,151 B2
(45) Date of Patent: Oct. 27, 2026

(54) METHOD AND DEVICE FOR PROCESSING VIDEO SIGNAL

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 63 days.

(21) Appl. No.: 18/886,137

(22) Filed: Sep. 16, 2024

(65) Prior Publication Data

US 2025/0016320 A1 Jan. 9, 2025

Related U.S. Application Data

(63) Continuation of application No. 17/760,554, filed as application No. PCT/KR2020/012865 on Sep. 23, 2020, now abandoned.

(30) Foreign Application Priority Data

Sep. 23, 2019 (KR) ........................ 10-2019-0116836
Sep. 23, 2019 (KR) ........................ 10-2019-0116837

(51) Int. Cl.
*H04N 19/122* (2014.01)
*H04N 19/124* (2014.01)
(Continued)

(52) U.S. Cl.
CPC ......... *H04N 19/122* (2014.11); *H04N 19/124* (2014.11); *H04N 19/136* (2014.11);
(Continued)

(58) Field of Classification Search
CPC .. H04N 19/122; H04N 19/124; H04N 19/136; H04N 19/176; H04N 19/18; H04N 19/60; H04N 19/70
(Continued)

(56) References Cited

U.S. PATENT DOCUMENTS

2013/0044810 A1* 2/2013 Kao ..................... H04N 19/436 375/240.03
2013/0051459 A1* 2/2013 Kirchhoffer ........... H04N 19/18 375/240.07
(Continued)

FOREIGN PATENT DOCUMENTS

CN 102196264 A 9/2011
CN 103907349 A 7/2014
(Continued)

OTHER PUBLICATIONS

Wang Ning et al., "Fast transform skip mode decision for high efficiency video coding", Journal of Image and Graphics, Feb. 2015, pp. 229-236, vol. 20, No. 2.
(Continued)

*Primary Examiner* — Edemio Navas, Jr.
*Assistant Examiner* — Jimmy S Lee
(74) *Attorney, Agent, or Firm* — IP Legal Services, LLC

(57) ABSTRACT

A video decoding method according to the present disclosure may comprise the steps of: determining whether an inverse transform is skipped in a current block; decoding a residual coefficient of the current block; and selectively applying the inverse transform to the residual coefficient on the basis of the determination. When decoding the residual coefficient, either a first syntax indicating whether the residual coefficient is greater than 0 or a second syntax indicating the absolute value of the residual coefficient may be selectively decoded.

15 Claims, 23 Drawing Sheets

(51) Int. Cl.

| | |
|---|---|
| ***H04N 19/136*** | (2014.01) |
| ***H04N 19/176*** | (2014.01) |
| ***H04N 19/18*** | (2014.01) |
| ***H04N 19/60*** | (2014.01) |
| ***H04N 19/70*** | (2014.01) |

(52) U.S. Cl.
CPC ........... *H04N 19/176* (2014.11); *H04N 19/18* (2014.11); *H04N 19/60* (2014.11); *H04N 19/70* (2014.11)

(58) Field of Classification Search
USPC ..................................................... 375/240.03
See application file for complete search history.

(56) References Cited

U.S. PATENT DOCUMENTS

| | | | |
|---|---|---|---|
| 2013/0272423 | A1 | 10/2013 | Chien et al. |
| 2013/0343448 | A1 | 12/2013 | He et al. |
| 2014/0269928 | A1 | 9/2014 | Piao et al. |
| 2014/0307801 | A1 | 10/2014 | Ikai et al. |
| 2015/0110199 | A1 | 4/2015 | Ikai et al. |
| 2015/0215644 | A1 | 7/2015 | Piao et al. |
| 2015/0215645 | A1 | 7/2015 | Piao et al. |
| 2015/0215646 | A1 | 7/2015 | Piao et al. |
| 2015/0215647 | A1 | 7/2015 | Piao et al. |
| 2015/0373334 | A1 | 12/2015 | Rapaka et al. |
| 2016/0330479 | A1* | 11/2016 | Liu ...................... H04N 19/176 |
| 2017/0041635 | A1 | 2/2017 | Ikai et al. |
| 2017/0078702 | A1 | 3/2017 | Ikai et al. |
| 2017/0127066 | A1 | 5/2017 | He et al. |
| 2017/0142448 | A1* | 5/2017 | Karczewicz ........... H04N 19/91 |
| 2017/0208330 | A1 | 7/2017 | Ikai et al. |
| 2017/0280162 | A1 | 9/2017 | Zhao et al. |
| 2017/0302934 | A1 | 10/2017 | Ikai et al. |
| 2018/0063553 | A1* | 3/2018 | Zhang .................. H04N 19/593 |
| 2018/0160144 | A1 | 6/2018 | Ikai et al. |
| 2018/0205951 | A1* | 7/2018 | Hsiang ................... H04N 19/13 |
| 2019/0052905 | A1 | 2/2019 | Ikai et al. |
| 2019/0281304 | A1 | 9/2019 | He et al. |
| 2019/0349587 | A1 | 11/2019 | Jang et al. |
| 2020/0045317 | A1 | 2/2020 | Ikai et al. |
| 2020/0154140 | A1 | 5/2020 | Ikai et al. |
| 2020/0169737 | A1 | 5/2020 | He et al. |
| 2020/0280740 | A1* | 9/2020 | Tsukuba ............... H04N 19/426 |
| 2020/0314430 | A1* | 10/2020 | Lasserre ................. G06F 17/18 |
| 2020/0322635 | A1 | 10/2020 | Koo et al. |
| 2021/0044802 | A1 | 2/2021 | Ikai et al. |
| 2021/0084335 | A1 | 3/2021 | Ikai et al. |
| 2022/0408092 | A1 | 12/2022 | Ikai et al. |
| 2023/0362381 | A1 | 11/2023 | Ikai et al. |

FOREIGN PATENT DOCUMENTS

| | | | |
|---|---|---|---|
| CN | 105659605 | A | 6/2016 |
| CN | 106664420 | A | 5/2017 |
| KR | 10-2019-0090865 | A | 8/2019 |
| WO | 2013/066051 | A1 | 5/2013 |
| WO | 2013/180023 | A1 | 12/2013 |
| WO | 2019/074291 | A1 | 4/2019 |

OTHER PUBLICATIONS

China National Intellectual Property Administration, Office Action of corresponding CN Patent Application No. 202080066694.2, Jul. 15, 2024.

China National Intellectual Property Administration, Notice of Allowance of corresponding CN Patent Application No. 202080066694.2, Apr. 15, 2025.

B. Bross et al., "Non-CE8: Unified Transform Type Signalling and Residual Coding for Transform Skip", Document: JVET-M0464-v4, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-13.

Marta Karczewicz et al., "CE7: Sign context, level mapping, and bitplane coding for TS residual coding (CE7-3.7, CE7-3.8, CE7-3.9, CE7-3.10, and CE7-3.11)", Document: JVET-00122-v3, Joint Video Experts Team (JVET) of ITU-T SG 16 WP 3 and ISO/IEC JTC 1/SC 29/WG 11, 15th Meeting: Gothenburg, SE, Jul. 3-12, 2019 , pp. 1-27.

Benjamin Bross et al., "Non-CE8: Unified Transform Type Signalling and Residual Coding for Transform Skip", Document: JVET-M0464 (version 4), Jan. 15, 2019.

Intellectual Property India, Office Action of corresponding Indian Patent Application No. 202217023001, Feb. 13, 2026.

* cited by examiner

100

(a) (b)

(a)

(b)

METHOD AND DEVICE FOR PROCESSING VIDEO SIGNAL

CROSS REFERENCE TO RELATED APPLICATIONS

This application is a Continuation of U.S. patent application Ser. No. 17/760,554 (filed on Mar. 15, 2022), which is a National Stage Patent Application of PCT International Patent Application No. PCT/KR2020/012865 (filed on Sep. 23, 2020) under 35 U.S.C. § 371, which claims priority to Korean Patent Application Nos. 10-2019-0116837 (filed on Sep. 23, 2019) and 10-2019-0116836 (filed on Sep. 23, 2019), the teachings of which are incorporated herein in their entireties by reference.

FIELD OF THE DISCLOSURE

The present disclosure relates to a method and a device for processing a video signal.

DESCRIPTION OF THE RELATED ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Purpose

A purpose of the present disclosure is to provide a method and a device of effectively encoding/decoding a residual coefficient in encoding/decoding a video signal.

A purpose of the present disclosure is to provide a method and a device of additionally applying second transform to a result of first transform in encoding/decoding a video signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

A method of decoding a video signal according to the present disclosure may include determining whether inverse transform is skipped for a current block, decoding a residual coefficient of the current block, and selectively applying the inverse transform to the residual coefficient based on the determination. In this case, when decoding the residual coefficient, one of a first syntax representing whether the residual coefficient is greater than 0 and a second syntax representing an absolute value of the residual coefficient may be selectively decoded.

A method of encoding a video signal according to the present disclosure may include determining whether transform will be skipped for a current block, quantizing a result that transform is applied or a result that transform is skipped, and encoding a residual coefficient output as a result of the quantization. In this case, when encoding the residual coefficient, one of a first syntax representing whether the residual coefficient is greater than 0 and a second syntax representing an absolute value of the residual coefficient may be selectively encoded.

In a method of decoding a video signal according to the present disclosure, whether the first syntax is to be decoded or the second syntax is to be decoded may be determined by comparing a threshold value with the number of bins decoded by using context information.

In a method of decoding a video signal according to the present disclosure, when at least one of the first syntax, at least one gt_N_flag representing whether an absolute value has a value greater than (2N−1) or a parity flag representing whether an absolute value is an even number is decoded, the number of bins decoded by using the context information may increase.

In a method of decoding a video signal according to the present disclosure, when the first syntax is decoded and the first syntax represents that the residual coefficient has a non-zero value, gt_1_flag representing whether an absolute value of the residual coefficient has a value greater than 1 may be additionally decoded.

In a method of decoding a video signal according to the present disclosure, when the gt_1_flag represents that the absolute value has a value greater than 1, a parity flag representing whether the absolute value is an even number and gt_2_flag representing whether the absolute value is greater than 3 may be additionally decoded.

In a method of decoding a video signal according to the present disclosure, the threshold value may be determined based on a size of the current block.

The characteristics which are simply summarized above for the present disclosure are just an illustrative aspect of a detailed description of the after-described present disclosure and do not limit a scope of the present disclosure.

Technical Effect

According to the present disclosure, encoding/decoding efficiency may be improved by setting an encoding method of a residual coefficient differently according to the number of bins encoded by using context information.

According to the present disclosure, encoding/decoding efficiency may be improved by additionally applying second transform to a result of first transform.

Effects obtainable from the present disclosure may be non-limited by the above-mentioned effect, and other unmentioned effects may be clearly understood from the following description by those having ordinary skill in the technical field to which the present disclosure pertains.

DETAILED DESCRIPTION OF THE DISCLOSURE

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference sign is used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term, and/or, includes a combination of a plurality of relative entered items or any item of a plurality of relative entered items.

When a component is referred to as being “linked” or “connected” to other component, it should be understood that it may be directly linked or connected to other component, but other component may exist in the middle. On the other hand, when a component is referred to as being “directly linked” or “directly connected” to other component, it should be understood that other component does not exist in the middle.

As terms used in this application are only used to describe a specific embodiment, they are not intended to limit the present disclosure. Expression of the singular includes expression of the plural unless it clearly has a different meaning contextually. In this application, it should be understood that a term such as “include” or “have”, etc. is to designate the existence of characteristics, numbers, stages, motions, components, parts or their combinations entered in a specification, but is not to exclude the existence or possibility of addition of one or more other characteristics, numbers, stages, motions, components, parts or their combinations in advance.

Hereinafter, referring to the attached drawings, a desirable embodiment of the present disclosure will be described in more detail. Hereinafter, the same reference sign is used for the same component in a drawing and an overlapping description for the same component is omitted.

Figure 1:
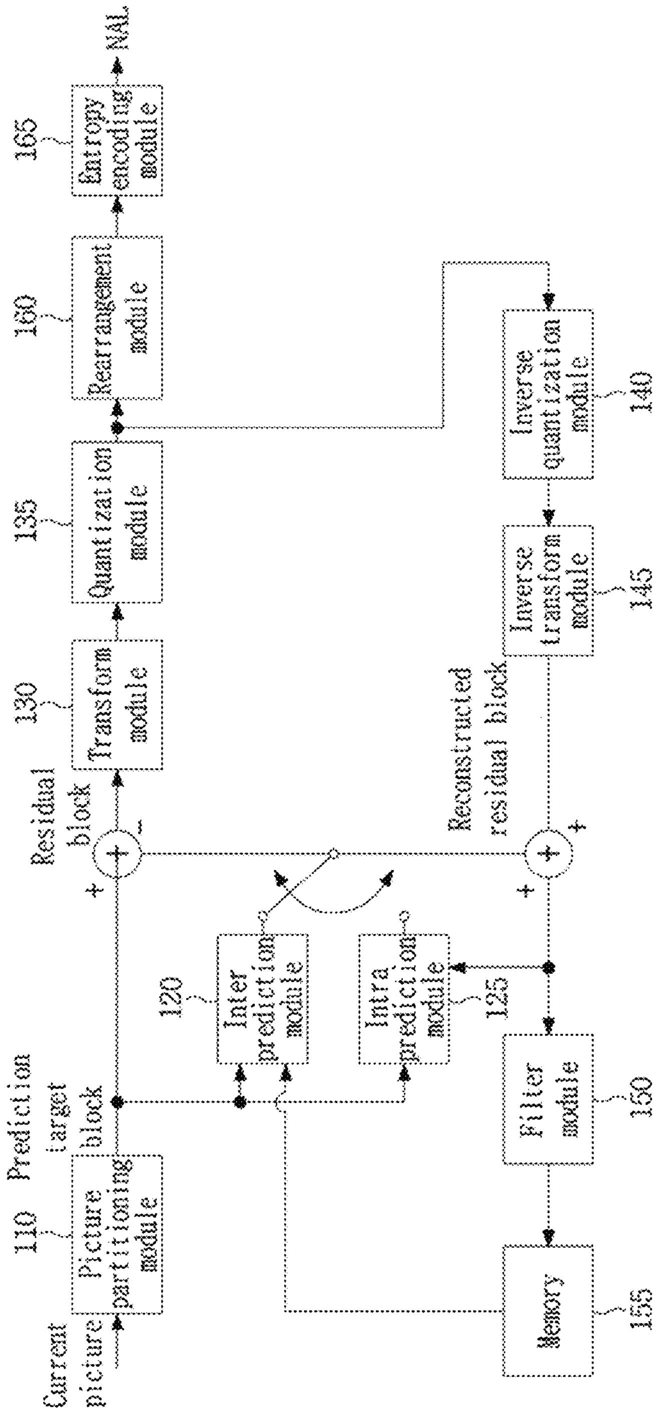
FIG. 1 is a block diagram showing an image encoding device according to an embodiment of the present disclosure.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit in FIG. 1 is independently shown to show different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from essence of the present disclosure.

Further, some components may be just an optional component for improving performance, not a necessary component which perform an essential function in the present disclosure. The present disclosure may be implemented by including only a construction unit necessary for implementing essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this connection, a processing unit may be a prediction unit (PU), a transform unit (TU), or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (for example, cost function).

For example, one picture may be partitioned into a plurality of coding units. In order to partition a coding unit in a picture, a recursive tree structure such as a quad tree structure may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

In generating a prediction unit performing intra prediction based on a coding block, when it is not the smallest coding unit, intra prediction may be performed without performing partitioning into a plurality of prediction units, N×N.

Prediction units 120 and 125 may include an inter prediction unit 120 performing inter prediction and an intra prediction unit 125 performing intra prediction. Whether to perform inter prediction or intra prediction for a prediction unit may be determined and detailed information according to each prediction method (for example, an intra prediction mode, a motion vector, a reference picture, etc.) may be determined. In this connection, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information used for prediction, motion vector information, etc. may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, an 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a unit of a ½ or ¼ pixel based on an interpolated pixel. A motion prediction unit may predict a current prediction unit by varying a motion prediction method. As A motion prediction method, various methods such as a skip method, a merge method, an advanced motion vector prediction (AMVP) method, an intra block copy method, etc. may be used.

An intra prediction unit 125 may generate a prediction unit based on reference pixel information around a current block, which is pixel information in a current picture. When a neighboring block in a current prediction unit is a block which performed inter prediction and thus, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, when a size of a prediction unit is different from that of a transform unit in performing intra prediction, intra prediction may be performed by using a reference pixel based on a transform unit. In addition, intra prediction using N×N partitioning may be used only for the smallest coding unit.

In an intra prediction method, a prediction block may be generated after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block which includes residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on an intra prediction mode information in a prediction unit which is used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement on coefficient values for a quantized residual value.

A rearrangement unit 160 may change a coefficient in a shape of a two-dimensional block into a shape of a one-dimensional vector through a coefficient scan method. For example, a rearrangement unit 160 may scan from a DC coefficient to a coefficient in a high frequency domain by using a zig-zag scan method and change it into a shape of a one-dimensional vector. According to a size of a transform unit and an intra prediction mode, instead of a zig-zag scan, a vertical scan where a coefficient in a shape of a two-dimensional block is scanned in a column direction or a horizontal scan where a coefficient in a shape of a two-dimensional block is scanned in a row direction may be used. In other words, which scan method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. Entropy encoding may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information in a coding unit and block type information, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 perform dequantization for values quantized in a quantization unit 135 and perform inverse transform on values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter is applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether ALF will be applied may be transmitted per coding unit (CU) for a luma signal and a shape and a filter coefficient of an ALF filter to be applied may vary according to each block. In addition, an ALF filter in the same shape (fixed shape) may be applied regardless of a feature of a block to be applied.

A memory 155 may store a reconstructed block or picture calculated through a filter unit 150 and a stored reconstructed block or picture may be provided to prediction units 120 and 125 when performing inter prediction.

Figure 2:
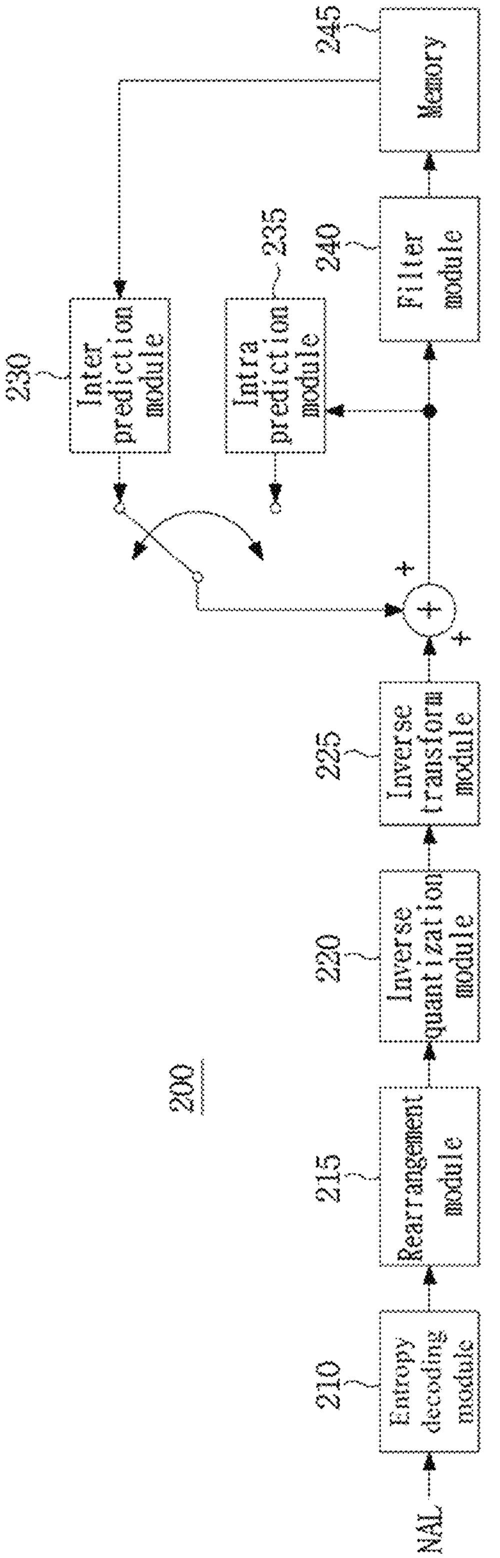
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients represented in a form of a one-dimensional vector may be rearranged by being reconstructed into coefficients in a form of a two-dimensional block. A rearrangement unit 215 may receive information related to a coefficient scan performed in an encoding unit and perform rearrangement through a method in which a scan is inversely performed based on a scan order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. Alternatively, an intra prediction unit 235 may perform intra prediction based on a palette mode and it will be described in detail by referring to FIG. 3 to FIG. 28. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'a unit' may represent a base unit for performing a specific encoding/decoding process and 'a block' may represent a pixel array in a predetermined size. Unless otherwise classified, 'a block' and 'a unit' may be used interchangeably. For example, in the after-described embodiment, it may be understood that a coding block (a coding block) and a coding unit (a coding unit) are used interchangeably.

An image may be encoded/decoded in a unit of a block. A coding block may be recursively partitioned based on a tree structure. In an example, a coding block may be partitioned by at least one of quad tree partitioning, binary tree partitioning or ternary tree partitioning.

In addition, a coding block may be partitioned into a plurality of prediction blocks or a plurality of transform blocks.

Figure 3:
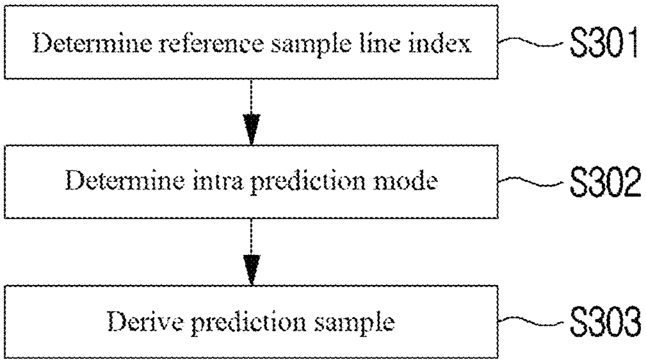
FIG. 3 is a flow diagram representing an intra prediction method according to an embodiment of the present disclosure.

FIG. 3 is a flow diagram representing an intra prediction method according to an embodiment of the present disclosure.

In reference to FIG. 3, an index of a reference sample line of a current block may be determined S301. The index may specify one of a plurality of reference sample line candidates. A plurality of reference sample line candidates may include an adjacent reference sample line adjacent to a current block and at least one non-adjacent reference sample line which is not adjacent to a current block.

In an example, an adjacent reference sample line composed of an adjacent row whose y-axis coordinate is smaller by 1 than an uppermost row of a current block and an adjacent column whose x-axis coordinate is smaller by 1 than a leftmost column of a current block may be used as a reference sample line candidate.

A first non-adjacent reference sample line including a non-adjacent row whose y-axis coordinate is smaller by 2 than an uppermost row of a current block and a non-adjacent column whose x-axis coordinate is smaller by 2 than a leftmost column of a current block may be used as a reference sample line candidate.

A second non-adjacent reference sample line including a non-adjacent row whose y-axis coordinate is smaller by 3 than an uppermost row of a current block and a non-adjacent column whose x-axis coordinate is smaller by 3 than a leftmost column of a current block may be used as a reference sample line candidate.

The index may indicate one of an adjacent reference sample line, a first non-adjacent reference sample line or a second non-adjacent reference sample line. In an example, when an index is 0, it means an adjacent reference sample line is selected, when an index is 1, it means a first non-adjacent reference sample line is selected, and when an index is 2, it means a second non-adjacent reference sample line is selected.

An index specifying one of a plurality of reference sample line candidates may be signaled in a bitstream.

Alternatively, an index may be signaled for a luma component block and signaling of an index may be omitted for a chroma component block. When signaling of an index is omitted, an index may be inferred to 0. In other words, for a chroma component block, intra prediction may be performed by using an adjacent reference sample line.

Reconstructed samples included by a selected reference sample line may be derived as reference samples.

Next, an intra prediction mode of a current block may be determined S302.

Figure 4:
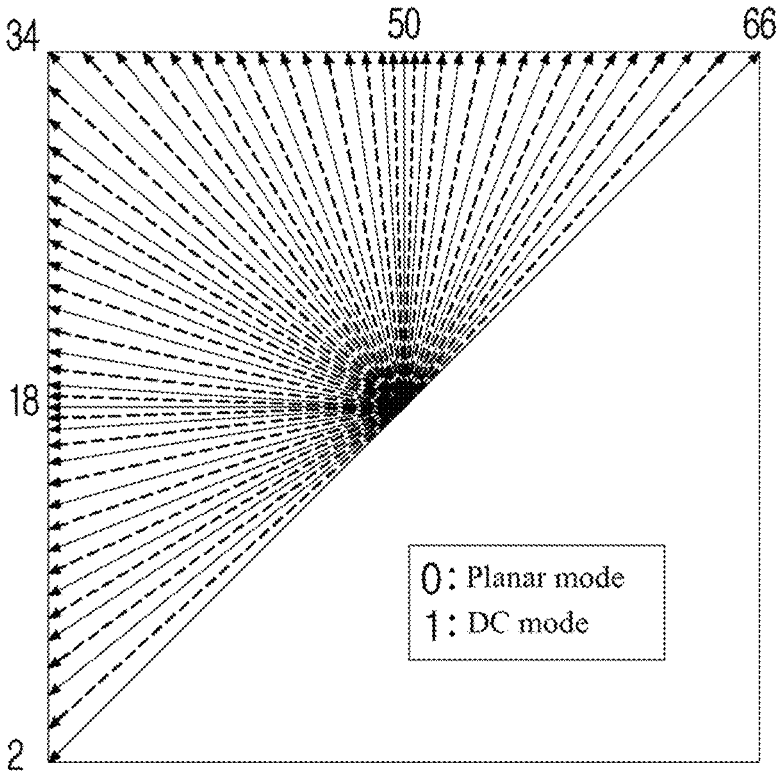
FIG. 4 illustrates a type of intra prediction modes.

FIG. 4 illustrates a type of intra prediction modes. As in an example shown in FIG. 4, intra prediction modes include a non-directional prediction mode (DC and Planar) and a directional prediction mode. FIG. 4 illustrated that 65 directional prediction modes are defined.

A flag representing whether an intra prediction mode of a current block is the same as a MPM (Most Probable Mode) may be signaled in a bitstream. In an example, when a value of a MPM flag is 1, it represents that there is the MPM identical to an intra prediction mode of a current block. On other hand, when a value of a MPM flag is 0, it represents that there is no MPM identical to an intra prediction mode of a current block.

When a value of a MPM flag is 1, a flag representing whether an intra prediction mode of a current block is the same as a default intra prediction mode may be signaled. A default intra prediction mode may be at least one of a DC, a Planar, a vertical directional prediction mode or a horizontal directional prediction mode. In an example, intra_not_planar_flag, a flag representing whether an intra prediction mode of a current block is a planar mode, may be signaled. When a value of the flag, intra_not_planar_flag, is 0, it represents that an intra prediction mode of a current block is a planar. On the other hand, when a value of the flag, intra_not_planar_flag, is 1, it represents that an intra prediction mode of a current block is not a planar. When a value of the flag, intra_not_planar_flag, is 1, an index specifying one of MPM candidates may be signaled. An intra prediction mode of a current block may be set to be the same as a MPM indicated by a MPM index.

Based on an intra prediction mode and reference samples belonging to a reference sample line, a prediction sample may be derived S303.

When an intra prediction mode of a current block is a directional prediction mode, a prediction sample may be derived by using a reference sample positioned on a line which follows an angle of a directional prediction mode.

When an intra prediction mode of a current block is a planar mode, a prediction sample may be derived by using a reference sample in a vertical direction of a sample to be predicted and a reference sample in a horizontal direction of the sample to be predicted.

Figure 5:
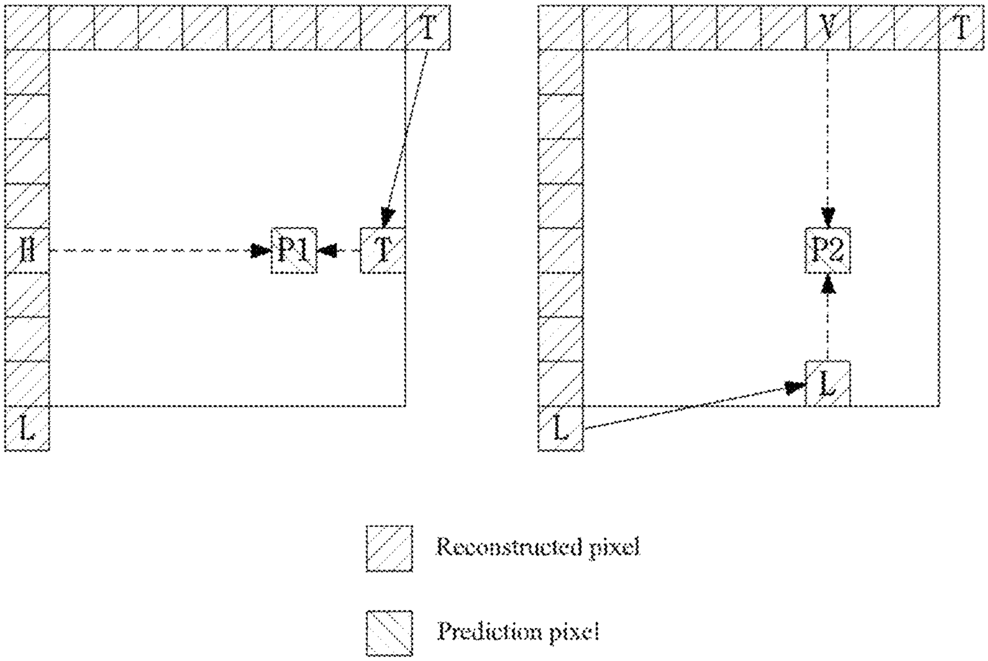
FIG. 5 is a drawing for describing an example of deriving a prediction sample under a planar mode.

FIG. 5 is a diagram for describing an example of deriving a prediction sample under a planar mode.

In FIG. 5, T represents a reference sample adjacent to a top-right corner of a current block and L represents a reference sample adjacent to a bottom-left corner of a current block.

Under a planar mode, for a sample to be predicted, horizontal directional prediction sample P1 and vertical directional prediction sample P2 may be derived.

Horizontal directional prediction sample P1 may be generated by performing linear interpolation for top-right reference sample T and reference sample H positioned on the same horizontal line as a sample to be predicted.

Vertical directional prediction sample P2 may be generated by performing linear interpolation for bottom-left reference sample L and reference sample V positioned on the same vertical line as a sample to be predicted.

Subsequently, based on a weighted sum operation of horizontal directional prediction sample P1 and vertical directional prediction sample P2, a prediction sample may be derived. Equation 1 represents an example in which prediction sample P is derived by a weighted sum operation of horizontal directional prediction sample P1 and vertical directional prediction sample P2.

$$P=(\alpha\times P1+\beta\times P2)/(\alpha+\beta) \quad \text{[Equation 1]}$$

In the Equation 1, α represents a weight applied to horizontal directional prediction sample P1 and β represents a weight applied to vertical directional prediction sample P2.

Weights α and β may be determined based on a size or a shape of a current block. Concretely, weights α and β may be determined by considering at least one of a width or a height of a current block. In an example, when a width and a height of a current block is the same, weights α and β may be set as the same value. When weights α and β are the same, a prediction sample may be derived as an average value of horizontal directional prediction sample P1 and vertical directional prediction sample P2. On the other hand, when a width and a height of a current block is different, weights α and β may be set differently. In an example, when a width of a current block is greater than a height, weight β may be set as a value larger than weight α and when a height of a current block is greater than a width, weight α may be set as a value larger than weight β. Alternatively, conversely, when a width of a current block is greater than a height, weight α may be set as a value larger than weight β and when a height of a current block is greater than a width, weight β may be set as a value larger than weight α.

In another example, weights α and β may be derived from one of a plurality of weight set candidates. In an example, when (1, 1), (3, 1) and (1, 3), weight candidate sets representing a combination of weights α and β, are predefined, weights a and B may be selected to be the same as one of the weight candidate sets.

An index indicating one of a plurality of weight set candidates may be signaled in a bitstream. The index may be signaled at a block level. In an example, an index may be signaled in a unit of a coding block or a transform block.

Alternatively, an index may be signaled at a level of a coding tree unit, a slice, a picture or a sequence. Blocks included in a unit of index transmission may determine weights α and β by referring to an index signaled at a higher level. In other words, for blocks included in a unit of index transmission, weights α and β may be set to be the same.

In an example of FIG. 5, it was shown that top-right reference sample T is used to derive horizontal directional prediction sample P1 and bottom-left reference sample L is used to derive vertical directional prediction sample P2.

Horizontal directional prediction sample P1 may be derived by using a reference sample other than a top-right reference sample or vertical directional prediction sample P2 may be derived by using a reference sample other than a bottom-left reference sample. In an example, reference sample set candidates for a first reference sample used to derive horizontal directional prediction sample P1 and a second reference sample used to derive vertical directional prediction sample P2 may be configured and horizontal directional prediction sample P1 and vertical directional prediction sample P2 may be derived by using one selected among a plurality of reference sample set candidates.

An index identifying one of a plurality of reference sample set candidates may be signaled in a bitstream. The index may be signaled in a unit of a block, a sub-block, or a sample.

Alternatively, a reference sample set candidate may be selected based on a position of a sample to be predicted.

Under a directional prediction mode, a prediction sample may be generated by using reconstructed pixels around a current block.

Figure 6:
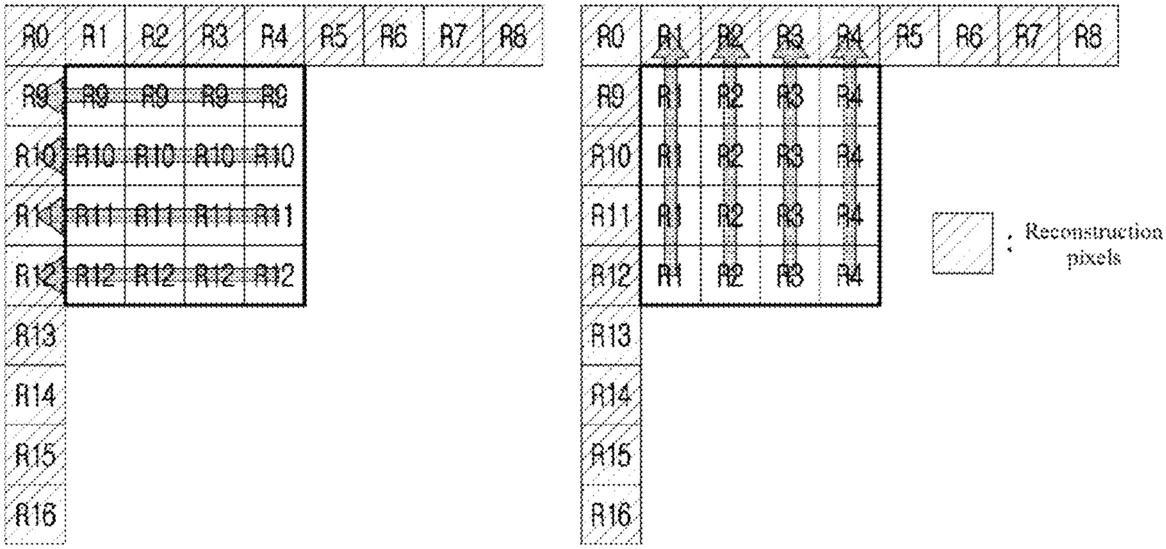
FIG. 6 represents an example in which a prediction sample is generated under a horizontal mode and a vertical mode.

FIG. 6 represents an example in which a prediction sample is generated under a horizontal mode and a vertical mode.

As in an example shown in FIG. 6, under a horizontal mode, a prediction sample may be generated by using a reconstructed sample at a horizontal direction of a sample to be predicted.

Under a vertical mode, a prediction sample may be generated by using a reconstructed sample at a vertical direction of a sample to be predicted.

After performing intra prediction based on an intra prediction mode, a residual block may be derived by subtracting a prediction block from an original block.

In this case, a prediction method using one of No. 0 mode to No. 66 mode may be used or a limited prediction method may be also used. In a limited prediction method, only an intra prediction mode in a horizontal direction (No. 18) or an intra prediction mode in a vertical direction (No. 50) may be used. In this case, an intra prediction mode may be specified by 1-bit information. Alternatively, diagonal directional prediction modes other than a vertical and horizontal direction, e.g., a bottom-left diagonal direction (No. 2) and a top-right diagonal direction (No. 66), may be added as an available candidate. In this case, an intra prediction mode may be specified by 2-bit information. Alternatively, 2 of 3 diagonal directional modes, e.g., a bottom-left diagonal direction (No. 2), a top-left diagonal direction (No. 34) and a top-right diagonal direction (No. 66), may be added as an available candidate.

The number of available intra prediction modes may be encoded and transmitted to a decoder. Alternatively, the number of intra prediction modes which may be used in an encoder and a decoder may be fixed. Alternatively, the number of available intra prediction modes may be determined based on a size or a shape of a current block.

After performing prediction, a residual block may be obtained by subtracting an original block and a prediction block. When a residual block is obtained, a residual coefficient may be obtained by performing at least one of transform or quantization for a residual block.

Information representing whether transform is applied to a current block may be encoded and signaled. In an example, transform_skip_flag may be encoded and signaled. When transform_skip_flag is 1, it represents that transform is not applied to a current block. Here, transform may include second transform as well as first transform which will be described later. When transform_skip_flag is 0, it represents that transform is applied to a current block. When transform_skip_flag is 0, first transform is necessarily applied to a current block, while second transform may be optionally applied.

Transform may be performed based on at least one of a DCT-based transform kernel or a DST-based transform kernel. Here, a DCT-based transform kernel may include at least one of DCT-2 or DCT-8 and a DST-based transform kernel may include DST-7. Additional transform may be applied to a result of transforming a residual sample. Hereinafter, for convenience of a description, transform performed by a DCT or DST-based transform kernel is referred to as first transform and transform additionally applied to a result of first transform is referred to as second transform. In addition, transform coefficients generated by a result of first transform are referred to as first transform coefficients and transform coefficients generated by a result of second transform are referred to as second transform coefficients.

Second transform may be applied to at least part of first transform coefficients. In an example, according to a size of a second transform kernel, second transform may be applied to 16, 48 or 64 first transform coefficients. A shape of a region which includes first transform coefficients to which second transform is applied may be square, non-square or polygonal.

Equation 2 represents an application aspect of second transform.

$$B_{R\times 1} = T_{R\times N} \cdot A_{N\times 1} \qquad \text{[Equation 2]}$$

In the Equation 2, B_R×1 represents second transform coefficients composed of R rows and 1 column. T_R×N represents a second transform kernel composed of R rows and N columns. A_N×1 represents first transform coefficients composed of N rows and 1 column.

Figure 7:
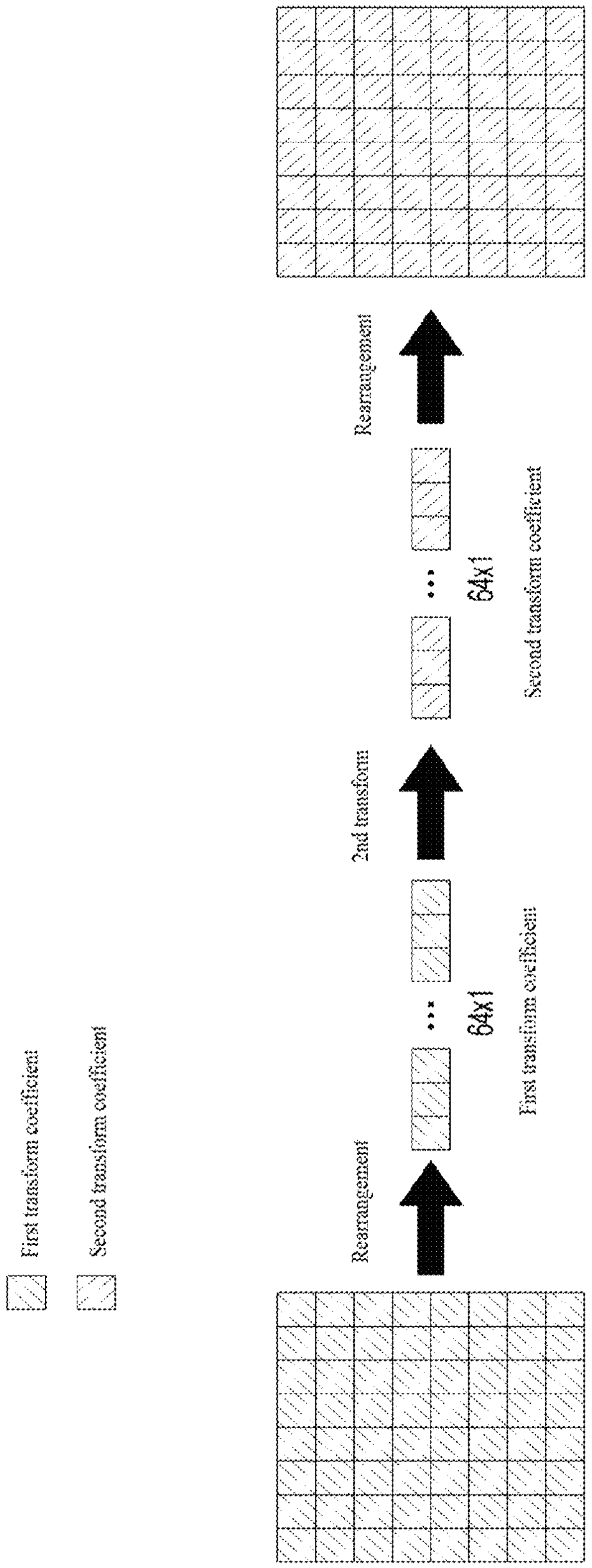
FIGS. 7 and 8 are a diagram representing an example in which second transform is applied.
Figure 8:
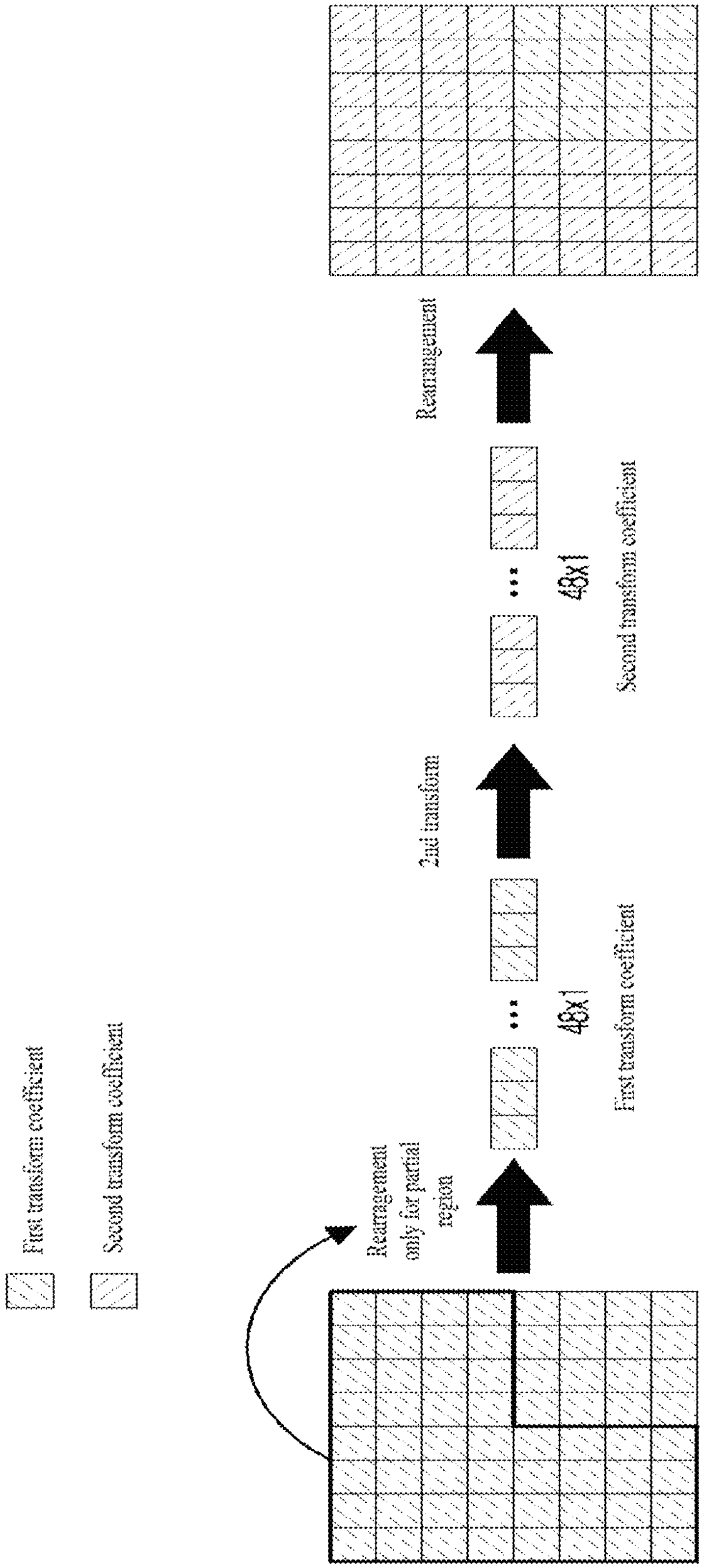

FIGS. 7 and 8 are a diagram representing an example in which second transform is applied.

FIG. 7 represents an example in which a second transform kernel has a 64×64 size. First transform coefficients generated by a result of first transform in an 8×8 block may be arranged in a one-dimension. In this case, a one-dimensional array may be generated by scanning first transform coefficients in a predetermined scan method. A predetermined scan method may include at least one of a diagonal directional scan, a horizontal directional scan, a vertical directional scan or a raster scan.

When a 64×1-sized input matrix is generated by the rearrangement, a second transform coefficient may be derived by a matrix product between a 64×64-sized second transform kernel and a 64×1-sized input matrix.

As a result of performing second transform, 64 second transform coefficients may be generated and second transform coefficients in an 8×8 block may be rearranged. After an 8×8 block that second transform coefficients are rearranged is quantized, a quantized transform block may be encoded.

FIG. 8 represents an example in which a second transform kernel has a 48×48 size. Among first transform coefficients generated by a result of first transform in an 8×8 block, 48 first transform coefficients may be rearranged in a one-dimension. In this case, 48 first transform coefficients may be included in a polygonal region excluding a 4×4-sized bottom-right sub-block in an 8×8 block.

When a 48×1-sized input matrix is generated by rearranging 48 first transform coefficients in a one-dimension, a second transform coefficient may be derived by a matrix product between a 48×48-sized second transform kernel and a 48×1-sized input matrix.

As a result of performing second transform, 48 second transform coefficients may be generated and second transform coefficients in an 8×8 block may be rearranged. In an example, 48 second transform coefficients may be rearranged in a polygonal region excluding a 4×4-sized bottom-right sub-block in an 8×8 block.

In a region where does not used arranging second transform coefficients, first transform coefficients may be maintained at they are. After applying quantization to a block including second transform coefficients and first transform coefficients, a quantized transform block may be encoded.

Alternatively, transform coefficients in a region where does not used arranging second transform coefficients may be set as 0. In other words, quantization and encoding may be performed after setting a value of transform coefficients in a region where second transform is not applied as 0.

A size of a second transform kernel may be determined based on a size of a current block. In an example, when at least one of a width or a height of a current block is 4, second transform may be applied to 16 first transform coefficients. On the other hand, when a width and a height of a current block is equal to or greater than 8, second transform may be applied to 48 or 64 first transform coefficients.

Alternatively, information representing a size and a type of a second transform kernel may be encoded and signaled. The information may be signaled at a block level. In an example, information specifying at least one of the number of columns or the number of rows of a transform size may be encoded. Alternatively, after assigning a different index to each of combinations of the number of rows and the number of columns, an index specifying one of the combinations may be encoded. Alternatively, after assigning a different index to each of a plurality of second transform kernel candidates, an index specifying one of the second transform kernel candidates may be encoded. Here, for each of a plurality of second transform kernel candidates, at least one of a size or a coefficient may be different.

Alternatively, based on a size of a current block, after determining a size of a second transform kernel, an index specifying one of a plurality of second transform kernel candidates having a determined size may be encoded.

An example shown in FIGS. 7 and 8 showed that a second transform kernel that the number of rows is the same as the number of columns is used. To simplify second transform, it is possible to set the number of rows and the number of columns differently.

Figure 9:
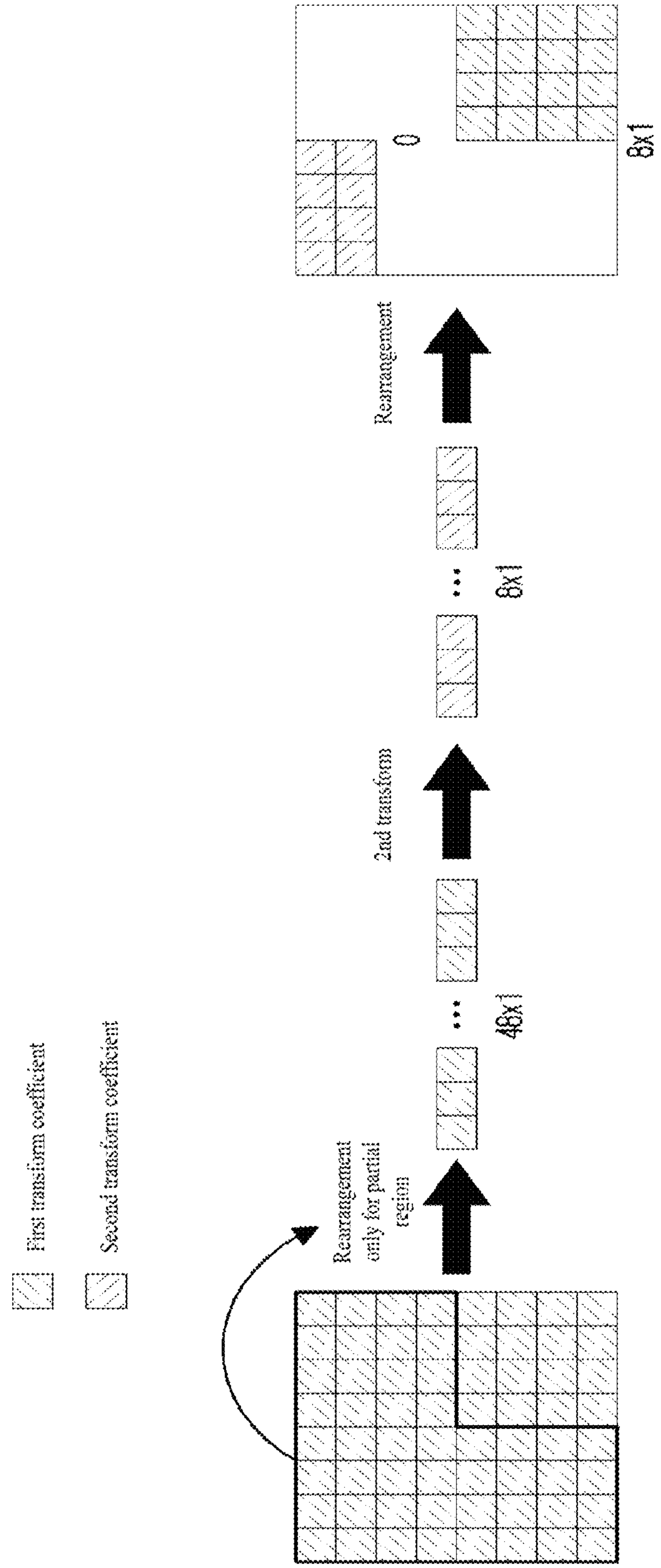
FIGS. 9 and 10 illustrate second transform based on a second transform kernel in an asymmetrical shape.
Figure 10:
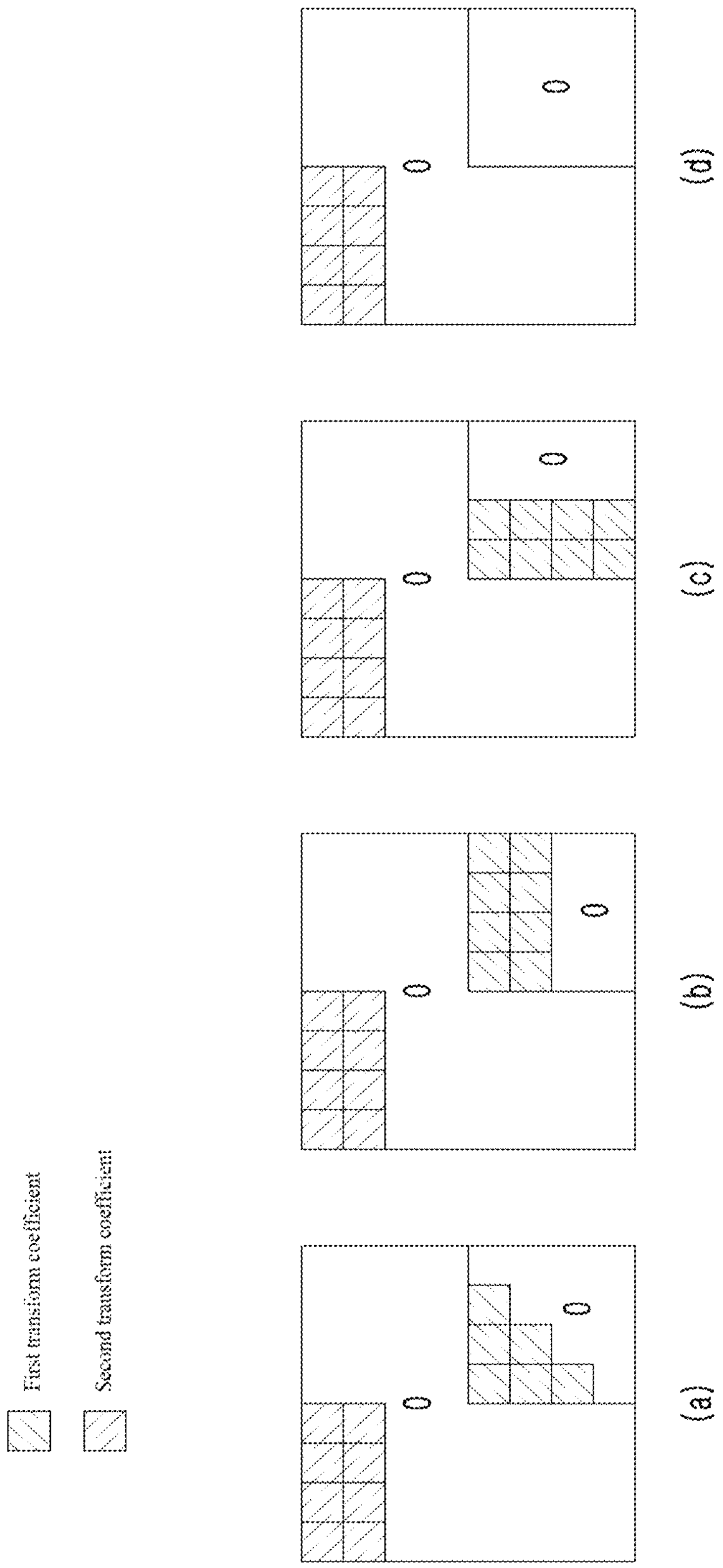

FIGS. 9 and 10 illustrate second transform based on a second transform kernel in an asymmetrical shape.

R, the number of rows of a second transform kernel, may be set as a value smaller than N, the number of columns. For example, R, the number of rows, may be set as 8 and N, the number of columns, may be set as 48.

When the number of rows of a second transform kernel decreases, the number of second transform coefficients output as a result of second transform also decreases. For example, when a matrix product between an 8×48-sized second transform kernel and a 48×1-sized input matrix is performed, 8×1-sized second transform coefficients are generated.

8 second transform coefficients may be rearranged in an 8×8 block. In this case, a value of transform coefficients may be set as 0 in a region where second transform coefficients are not assigned within a region where second transform is applied (i.e., a region where first transform coefficients to which second transform is applied are included). For example, when a polygonal region including 48 samples is a region where second transform is applied, a value of transform coefficients may be set as 0 in remaining regions excluding a region where 8 second transform coefficients are assigned among the polygonal regions.

In a region where second transform is not applied, first transform coefficients may be maintained as they are.

Alternatively, at least part of first transform coefficients in a region where second transform is not applied may be converted into 0 and encoded. In FIG. 10, an example was illustrated in which at least part of a region where second transform is not applied is converted into 0.

As in an example shown in FIG. 10(*a*), within a region where second transform is not performed, a value of first transform coefficients corresponding to a high-frequency domain may be converted into 0. In an example, a value of first transform coefficients that a sum of an x-axis and y-axis coordinate is equal to or greater than a threshold value may be converted into 0.

Alternatively, according to a shape, first transform coefficients converted into 0 may be selected. In an example, as in an example shown in FIG. 10(*b*), first transform coefficients included in n bottom rows within a region where second transform is not performed may be converted into 0. Alternatively, as in an example shown in FIG. 10(*c*), first transform coefficients included in n right columns within a region where second transform is not performed may be converted into 0.

Alternatively, as in an example shown in FIG. 10(*d*), all first transform coefficients within a region where second transform is not performed may be converted into 0.

A shape of a region including first transform coefficients converted into 0 may be determined based on at least one of a size or a shape of a current block, an intra prediction mode or a transform kernel. Alternatively, an index specifying one corresponding to the region among a plurality of candidate shapes may be encoded and signaled.

Whether second transform is allowed may be determined based on at least one of a first transform kernel or an encoding mode of a current block. Here, the encoding mode indicates intra prediction or inter prediction. In an example, while second transform is allowed when a current block is encoded by intra prediction, second transform may not be allowed when a current block is encoded by inter prediction.

Information representing whether second transform was applied may be encoded and signaled. The information may be a 1-bit flag. According to whether the flag is true or false, whether second transform was applied to a current block may be determined. Alternatively, the information may be index information. When a value of an index is 0, it represents that second transform is not applied to a current block. On the other hand, when a value of an index is greater than 0, it represents that second transform was applied to a current block. When a value of an index is greater than 0, a second transform kernel may be specified by an index.

Information representing whether second transform was performed for a current block may be individually encoded per color component. In an example, for each of a luma component (Y), a first chroma component (Cb) and a second chroma component (Cr), information representing whether second transform was performed may be encoded.

Alternatively, for chroma components, information representing whether second transform was performed may be jointly encoded. In an example, for each of chroma components (Cb, Cr), whether second transform is applied may be jointly determined. In other words, a first chroma component (Cb) and a second chroma component (Cr) may share information representing whether second transform was performed.

Alternatively, whether the information was encoded per color component may be determined based on a tree structure. In an example, when a luma component and a chroma component have the same tree structure, 3 color components (i.e., Y, Cb, Cr) may share information representing whether second transform is performed. On the other hand, when a luma component and a chroma component have a different tree structure, information representing whether second transform is performed may be signaled for each of a luma component and a chroma component.

A plurality of second transform kernel candidates may be grouped into at least a plurality of groups. Based on at least one of a size or a shape of a current block or an intra prediction mode among, one of a plurality of groups may be specified. When a group is specified, at least one of a plurality of second transform kernel candidates included in the specified group may be specified by using the index information.

Whether information representing whether second transform is applied is encoded may be determined based on a position of a last non-zero coefficient in a current block.

Figure 11:
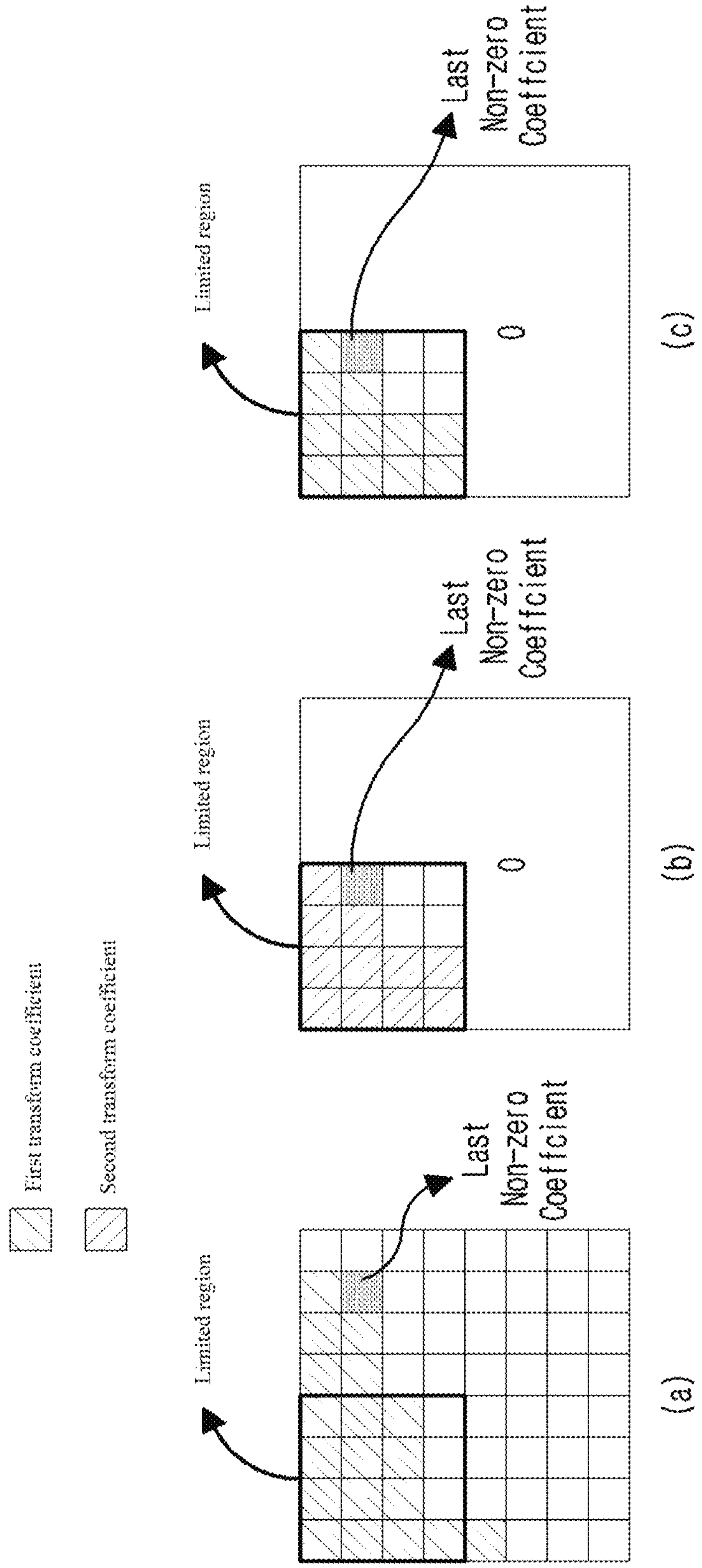
FIG. 11 represents an example in which whether information representing whether second transform is applied is encoded is determined based on a position of a last non-zero coefficient.

FIG. 11 represents an example in which whether information representing whether second transform is applied is encoded is determined based on a position of a last non-zero coefficient.

For convenience of a description, it is assumed that when second transform is performed, a value of transform coefficients is set as 0 in remaining regions excluding a region where second transform coefficients are rearranged.

As a result of performing second transform, as many second transform coefficients as R, the number of rows of a second transform kernel, are generated. As in the above-described example, as all values of remaining transform coefficients excluding second transform coefficients are set as 0, there is no non-zero coefficient in remaining regions excluding a region where R second transform coefficients are rearranged. According to the principle, a region where R second transform coefficients are rearranged may be set as a limited region.

In FIG. 11(*a*) to (*c*), it was illustrated that a 4×4-sized top-left block in an 8×8-sized block is set as a limited region.

When a non-zero coefficient exists out of a limited region, it represents that second transform was not applied to a current block. Accordingly, when a last non-zero coefficient exists out of the limited region, encoding of information representing whether second transform was applied to a current block may be omitted. In an example, as in an example shown in FIG. 11(*a*), when a last non-zero coefficient exists out of a limited region, encoding of information representing whether the second transform was applied may be omitted.

When a last non-zero coefficient exists out of a limited region, a decoder may determine that second inverse transform is not applied to a current block without decoding the information.

As in an example shown in FIG. 11(*b*), when second transform is applied to a current block, a non-zero transform coefficient may exist only in a limited region. Alternatively, as in an example shown in FIG. 11(*c*), although second transform is not applied to a current block, a case may occur in which a non-zero transform coefficient exists only in a limited region. Accordingly, when a last non-zero coefficient exists within a limited region, information representing whether second transform was applied may be encoded.

A decoder may determine whether second inverse transform will be applied to a current block based on the information.

Alternatively, when a last non-zero coefficient exists within a limited region, encoding of the information may be omitted and second transform may be applied by default.

A size of a limited region may be determined based on a size of a second transform kernel. In an example, when a second transform kernel is a R×N-sized matrix, a rectangular region whose width and height are $\mathrm{Log}_2$ R respectively may be set as a limited region.

Alternatively, a region to which second transform is applied may be set as a limited region.

Alternatively, information representing at least one of a size or a shape of a limited region may be encoded and signaled. The information may be signaled at a higher level such as a sequence, a picture header or a slice header.

Alternatively, at least one of a size or a shape of a limited region may be predefined in an encoder and a decoder. In an example, between an encoder and a decoder, it may be pre-promised to set a 4×4-sized top-left block in a current block as a limited region.

Alternatively, at least one of a size or a shape of a limited region may be adaptively determined based on at least one of a size or a shape of a current block, a first transform kernel or an intra prediction mode.

Alternatively, after defining a plurality of limited region candidates, an index specifying one of a plurality of limited region candidates may be encoded and signaled.

Figure 12:
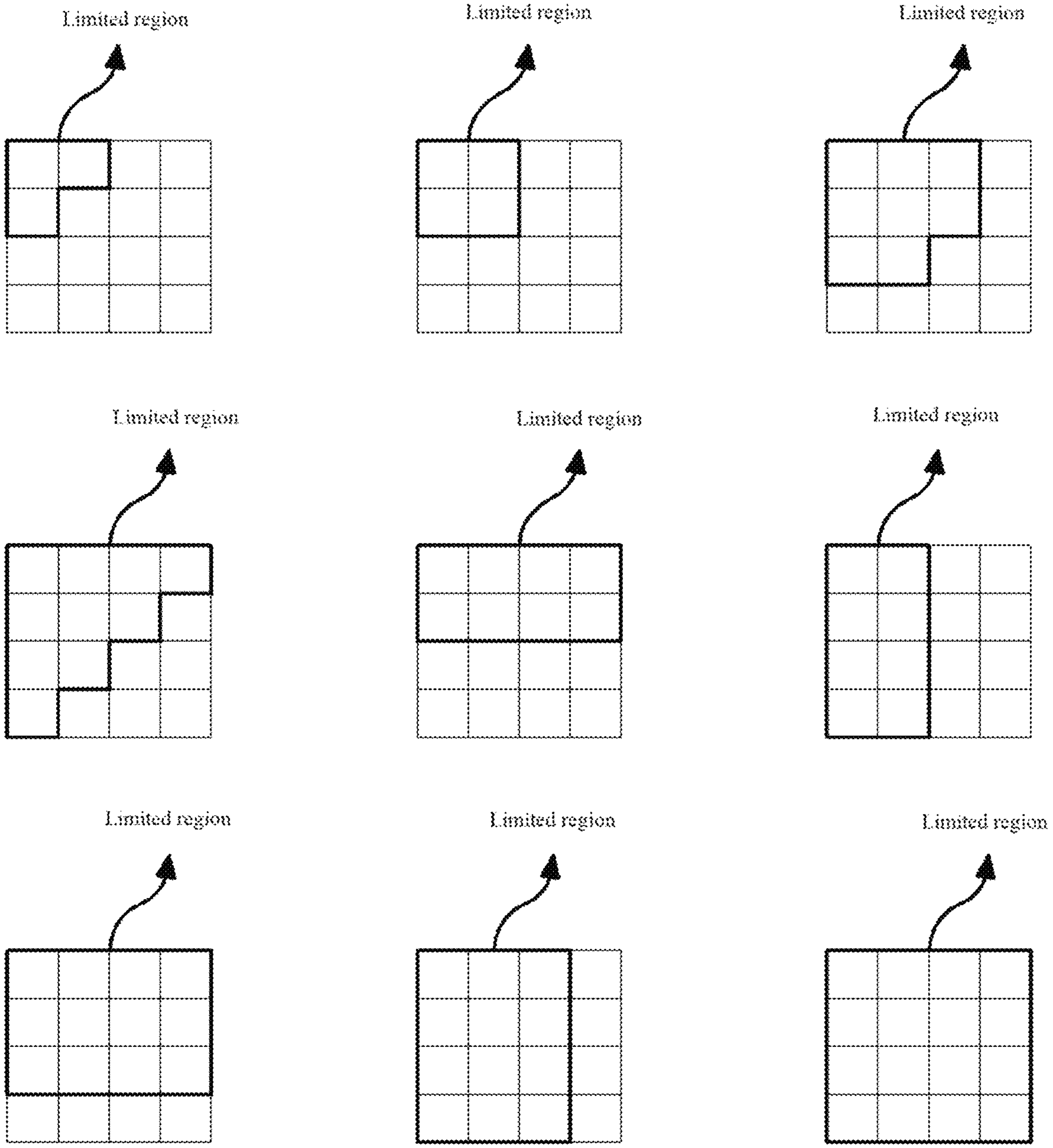
FIG. 12 illustrates limited region candidates for a 4×4-sized block.

FIG. 12 illustrates limited region candidates for a 4×4-sized block.

When a current block has a 4×4 size, index information specifying one of a plurality of limited region candidates shown in FIG. 12 may be encoded.

At least one of limited region candidates shown in FIG. 12 may be applied to a block having a size greater than 4×4 as well as a 4×4-sized block. In an example, at least one of limited region candidates shown in FIG. 12 may be also applied to a block that at least one of a width or a height is 4 and the other is larger than 4.

Alternatively, a size or the number of limited region candidates may be set differently according to a size of a current block.

Instead of encoding an index specifying one of limited region candidates, one of limited region candidates may be specified based on a size or a shape of a current block.

In the above-described example, it was described that a size of a second transform kernel may be adaptively selected. In other example, a second transform kernel in a predefined size may be applied to all blocks. In an example, a 16×48-sized second transform kernel may be used for all blocks. In this case, second transform may be applied to 48 first transform coefficients.

Figure 13:
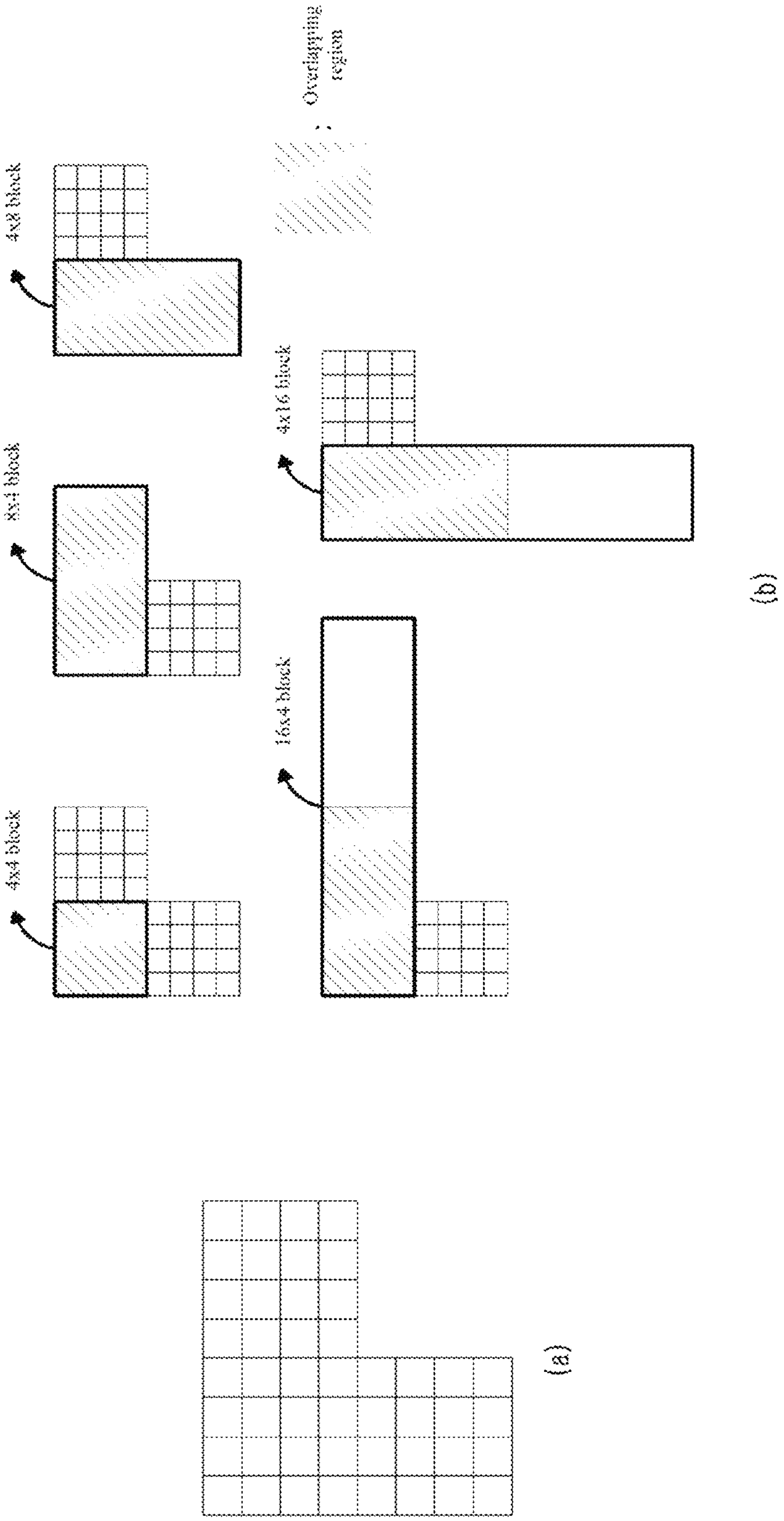
FIG. 13 is a diagram representing an example to which a second transform kernel in a predefined size is applied.

FIG. 13 is a diagram representing an example to which a second transform kernel in a predefined size is applied.

When a 16×48-sized second transform kernel is used, as in an example shown in FIG. 13(*a*), second transform may be applied to a region where a 4×4-sized bottom-right sub-block in an 8×8-sized block is excluded. In an example, second transform may be applied to first transform coefficients included in a polygonal region shown in FIG. 13(*a*).

In this case, when at least one of a width or a height of a current block is smaller than 8, second transform may not be applied to a current block.

Alternatively, when at least one of a width or a height of a current block is smaller than 8, second transform may be performed after transforming a region to which second transform is applied into a rectangular shape such as 4×12 or 12×4.

Alternatively, when at least one of a width or a height of a current block is smaller than 8, second transform may be applied only to an overlapping region between a current block and a region to which second transform is applied after matching a top-left position of a current block with a top-left region of a region to which second transform is applied.

FIG. 13(*b*) represents an example in which second transform is performed only for an overlapping region.

After first transform coefficients included in an overlapping region are arranged in a one-dimension, it may be set as an input matrix for second transform.

When first transform and second transform are applied to a current block, a decoder may derive a residual sample by performing inverse transform to first transform (first inverse transform) for a result of performing second inverse transform after performing inverse transform to second transform (second inverse transform).

Second inverse transform may be performed based on a transposed matrix of a second transform kernel. In an example, when a second transform kernel has an 8×48 size, second inverse transform may be performed by a 48×8-sized transform kernel.

Second transform coefficients generated by second transform may be set as an input matrix of second inverse transform. In an example, when second transform is performed by an 8×48-sized second transform kernel, an 8×1-sized input matrix composed of 8 coefficients may be used when second inverse transform is performed. Subsequently, transform coefficients that second inverse transform was performed may be output by a matrix product between an input matrix and a transposed matrix of a second transform kernel. In an example, 48 transform coefficients may be output by a matrix product between a 48×8-sized transform kernel and an 8×1-sized input matrix.

After rearranging transform coefficients in a current block, first inverse transform may be applied to a rearranged block.

After quantizing a transform coefficient generated by transforming a residual sample, a quantized transform coefficient may be encoded. Alternatively, quantization may be omitted and a transform coefficient may be encoded.

When transform is not applied to a current block, a residual sample may be quantized and a quantized residual sample may be encoded.

When transform is skipped, quantization information may be additionally encoded per block. In an example, quantization information for a transform skip encoded by applying DPCM (Differential Pulse-Coded Modulation) to quantization information transmitted through a sequence, a picture header or a slice header may be additionally signaled.

After quantization is performed, run-length encoding may be applied. In other words, quantized coefficients generated by a result of quantization may be encoded by a run-length method. Here, run means that the same data is consecutive and run length means a length of consecutive data. In an example, when there is a string, aaaaaabbccccccc, a is consecutive 6 times, b is consecutive 2 times and c is consecutive 7 times, so it may be expressed as 6a2b7c or a6b2c7 and encoded.

The encoding method may be defined as a run-length encoding method.

For effective run-length encoding, an optimum scan method may be determined.

Figure 14:
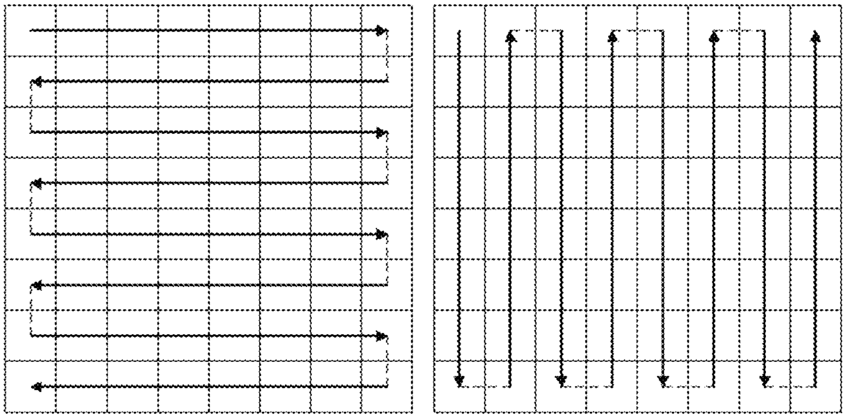
FIG. 14 illustrates a scan method.
Figure 14:
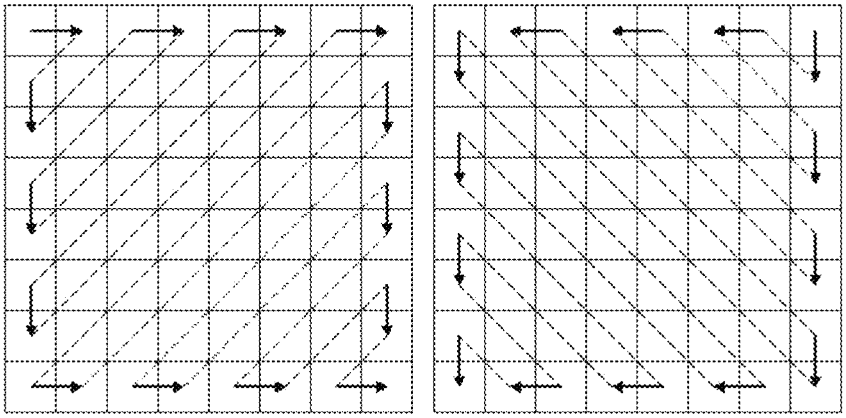

FIG. 14 illustrates a scan method. According to a scan method shown in FIG. 14, coefficients are scanned according to specific directivity. Among scan methods shown in FIG. 14, when the same values are consecutively arranged, it may be determined as an optimum scan method.

When a transform skip is applied to a current block, information specifying a scan method of a current block may be encoded and signaled. The information may be an index specifying one of a plurality of scan methods.

The number or a type of available scan method candidates may be set differently based on at least one of a size, a shape or an intra prediction mode of a current block. In an example, when an intra prediction mode of a current block is in a horizontal direction or in a vertical direction, only 2 scan methods shown in FIG. 4 may be set as a candidate. On the other hand, when an intra prediction mode of a current block is in a diagonal direction (e.g., 2, 34 or 66), all of 4 scan methods shown in FIG. 14 may be set as a candidate. Accordingly, according to an intra prediction mode of a current block, a bit length assigned to an index for specifying a scan method may be different. In an example, when an intra prediction mode of a current block is in a horizontal direction or in a vertical direction, an index may have a 1-bit length. On the other hand, when an intra prediction mode of a current block is in a diagonal direction, an index may have a 2-bit length.

Alternatively, a scan method may be determined based on at least one of a size, a shape or an intra prediction mode of a current block. In an example, when an intra prediction mode is in a horizontal direction, a horizontal directional scan method or a vertical directional scan method shown in FIG. 14(*a*) may be applied.

Instead of encoding quantized coefficients by a run-length method, an encoding method in which additional prediction is applied to quantized coefficients may be applied. In an example, when a residual block is generated by intra prediction in a current block, quantization may be performed by skipping transform for the residual block. When a coefficient quantized by the quantization is output, DPCM may be applied to an output value.

One of a plurality of direction candidates may be used for DPCM. In an example, horizontal directional DPCM or vertical directional DPCM may be applied to a quantized coefficient.

An encoder may encode and signal information for specifying a DPCM direction applied to a quantized residual coefficient. Alternatively, a prediction direction used to generate a prediction block may be set as a DPCM direction.

A DPCM direction may be used when predicting an intra prediction mode. In an example, when horizontal directional DPCM is applied to a neighboring block in deriving a MPM candidate of a current block, a MPM may be derived by considering an intra prediction mode of a neighboring block as a horizontal direction and. Alternatively, when vertical directional DPCM is applied to a neighboring block in deriving a MPM candidate of a current block, a MPM may be derived by considering an intra prediction mode of a neighboring block as a vertical direction. Alternatively, when diagonal directional DPCM is applied to a neighboring block, a MPM may be derived by considering an intra prediction mode of a neighboring block as a diagonal direction (e.g., 2, 34 or 66) or a nondirectional mode (e.g., planar or DC).

In this case, a MPM directly derived from a DPCM direction may have a highest or a lowest priority among MPM candidates. Here, a highest priority may mean a lowest index among MPM candidates is assigned (i.e., set as a first MPM) and a lowest priority may mean a highest index among MPM candidates is assigned (i.e., set as a last MPM).

For convenience of a description, residual signal-related data encoded in an encoder is referred to as a residual coefficient. For example, a residual coefficient may mean at least one of a quantized transform coefficient, a transform coefficient or a quantized residual sample according to whether transform or quantization is applied.

A flag representing whether a non-zero residual coefficient exists in a current block may be encoded and signaled. When a non-zero residual coefficient exists in a current block, a position of a last non-zero residual coefficient in scan order may be encoded.

In addition, a sub-block flag representing whether a non-zero residual coefficient exists in a sub-block may be encoded in a unit of a sub-block in a current block. When a non-zero residual coefficient exists in a sub-block, information on each residual coefficient may be additionally encoded in scan order.

In this case, encoding of a sub-block flag may be omitted for a sub-block which is scanned before a sub-block including a last non-zero residual coefficient. As a non-zero residual coefficient is not included in the sub-block, a value of a sub-block flag may be inferred to 0.

In addition, encoding of a sub-block flag may be omitted for a sub-block including a last non-zero residual coefficient. As a non-zero residual coefficient is necessarily included in the sub-block, a value of a sub-block flag may be inferred to 1.

In another example, encoding of position information of a last non-zero residual coefficient may be omitted. When encoding of position information of a last non-zero residual coefficient is omitted, a sub-block flag may be encoded for all sub-blocks in a current block.

In this case, when it is determined that a non-zero residual coefficient is not included in remaining sub-blocks excluding a sub-block with last scan order, it may be understood that a non-zero residual coefficient should be included in a last sub-block. Accordingly, encoding of a sub-block flag may be omitted for a last sub-block and that value may be inferred to 1.

Information representing whether position information of a last non-zero coefficient is encoded may be additionally encoded. When position information of a last non-zero coefficient is encoded, a value of the information may be set as 1. In this case, a sub-block flag may be encoded from a sub-block that a last non-zero coefficient exists. On the other hand, when position information of a last non-zero coefficient is not encoded, a value of the information may be set as 0. In this case, a sub-block flag may be encoded from a sub-block which is scanned first.

When there is a non-zero residual coefficient in a current block, it may be assumed that for a first sub-block in the current block, a non-zero residual coefficient is necessarily included. Accordingly, encoding of a sub-block flag representing whether a non-zero residual coefficient exists may be omitted for a first sub-block.

Information on each residual coefficient may include at least one of a flag representing whether a residual coefficient has a non-zero value, information representing a size of a residual coefficient and information representing a sign of a residual coefficient.

Residual coefficients may be encoded in predetermined scan order. In this case, encoding order of residual coefficients may be different based on whether transform is skipped in a current block. In an example, when transform is not skipped in a current block, a residual coefficient at a bottom-right position in a sub-block may be encoded first and a residual coefficient at a top-left position may be encoded last. In other words, scan order between residual coefficients may be determined according to an inverse-diagonal scan, an inverse-horizontal scan or an inverse-vertical scan. On the other hand, when transform is skipped in a current block, a residual coefficient at a top-left position in a sub-block may be encoded first and a residual coefficient at a bottom-right position may be encoded last. In other words, scan order between residual coefficients may be determined according to a diagonal scan, a horizontal scan or a vertical scan.

Alternatively, when transform is skipped in a current block, scan order between residual coefficients may be determined according to an inverse-diagonal scan, an inverse-horizontal scan or an inverse-vertical scan.

Scan order of residual coefficients may be predefined in an encoder and a decoder. Alternatively, information representing scan order of residual coefficients may be encoded and signaled. Alternatively, scan order may be determined based on at least one of a size or a shape of a current block, an intra prediction mode, whether transform is skipped or whether second transform is performed.

Figure 15:
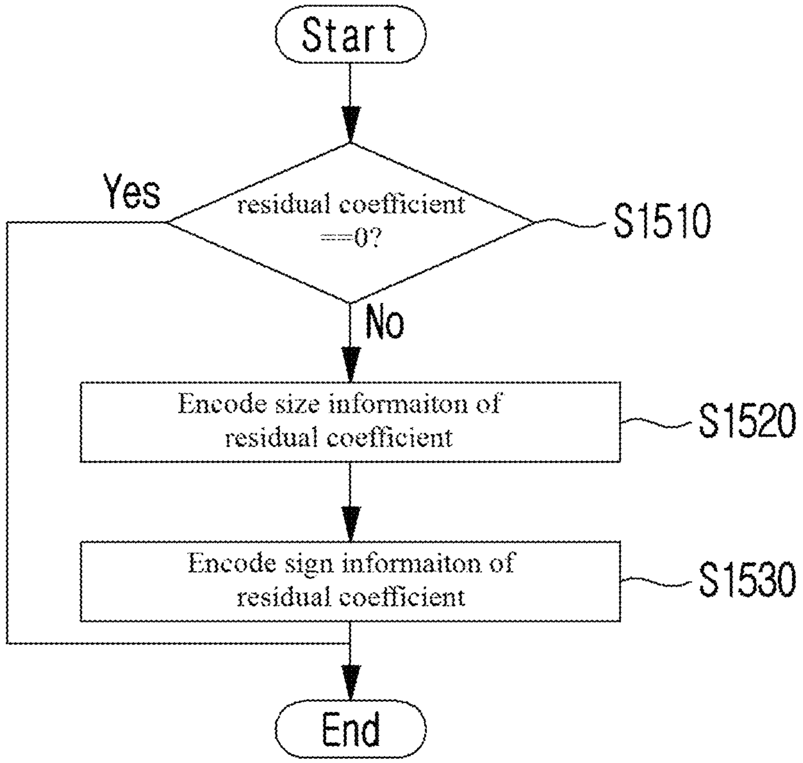
FIG. 15 is a flow chart representing a process of encoding a residual coefficient in an encoder.

FIG. 15 is a flow chart representing a process of encoding a residual coefficient in an encoder.

First, significant_flag, a flag representing whether a residual coefficient has a non-zero value, may be encoded S1510. When a value of a residual coefficient is 0, a value of a flag, sig_flag, may be set as 0 and encoded. On the other hand, when a value of a residual coefficient is not 0, a value of a flag, sig_flag, may be set as 1 and encoded. When a value of a residual coefficient is not 0, size information of a residual coefficient may be further encoded S1520.

Figure 16:
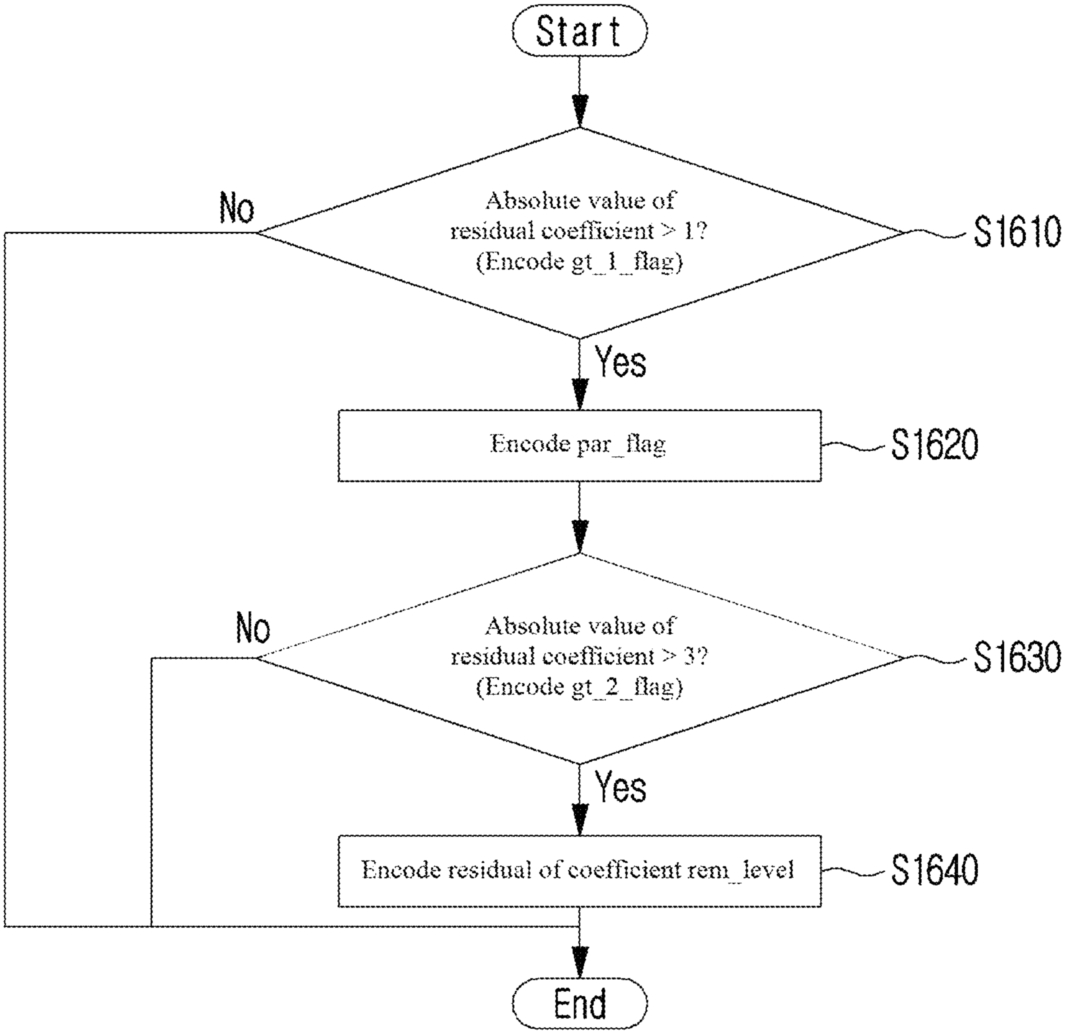
FIG. 16 is a flow chart representing a process of encoding size information of a residual coefficient.

FIG. 16 is a flow chart representing a process of encoding size information of a residual coefficient.

An absolute value of a residual coefficient may be encoded by using at least one or more gt_N_flags. In this case, N may be a natural number equal to or greater than 1. A flag, gt_N_flag, may represent whether an absolute value of a residual coefficient has a value greater than 2(N−1). The number of gt_N_flags used to encode an absolute value of a residual coefficient may be determined based on whether transform was skipped in a current block. In an example, when transform is not skipped in a current block, 2 gt_N_ flags (N is from 1 to 2) may be used. On the other hand, when transform is skipped in a current block, 3 or more gt_N_flags (e.g., 3, 4, or 5) may be used. In this embodiment, it is assumed that 2 gt_N_flags are used.

gt1_flag, a flag representing whether an absolute value of a residual coefficient is greater than 1, may be encoded S1610. When an absolute value of a residual coefficient is 1, a value of a flag, gt1_flag, may be encoded with 0. On the other hand, when an absolute value of a residual coefficient is greater than 1, a value of a flag, gt1_flag, may be encoded with 1.

When an absolute value of a residual coefficient is greater than 1, par_flag, a flag representing whether an absolute value of a residual coefficient is an even number or an odd number, may be encoded S1620. When an absolute value of a residual coefficient is an even number, a flag, par_flag, may be set as 0 and encoded. On the other hand, when an absolute value of a residual coefficient is an odd number, a flag, par_flag, may be set as 1 and encoded. Alternatively, conversely, when an absolute value of a residual coefficient is an even number, a flag, par_flag, may be set as 1 and when an absolute value of a residual coefficient is an odd number, a flag, par_flag, may be set as 0.

Next, gt_2_flag, a flag representing whether an absolute value of a residual coefficient is greater than 3, may be encoded S1630. When an absolute value of a residual coefficient is equal to or less than 3, a value of a flag, gt_2_flag, may be set as 0. On the other hand, when an absolute value of a residual coefficient is greater than 0, a value of a flag, gt_2_flag, may be set as 1.

When an absolute value of a residual coefficient is greater than 3, rem_level representing a residual size may be encoded S1640. A syntax, rem_level, may be derived by shifting a value derived by subtracting 4 from an absolute value of a residual coefficient by 1 to the right.

Besides a flag, gt_1_flag and gt_2_flag, shown in FIG. 16, gt_N_flag such as gt_3_flag, gt_4_flag or gt_5_flag, etc. may be additionally encoded. In this case, when a value of gt_N−1)_flag is 1, gt_N_flag may be additionally encoded. gt_N_flag may represent whether an absolute value of a residual coefficient has a value greater than (2N−1). When gt_N_flag is additionally used, rem_level may be derived by shifting a value derived by subtracting 2N from an absolute value of a residual coefficient by 1 to the right.

In the above-described example, it was illustrated that an absolute value of a residual coefficient is encoded by using sig_flag, gt_1_flag, par_flag, gt_2_flag and rem_level. In another example, an absolute value of a residual coefficient may be encoded as it is. In an example, abs_level, a syntax representing an absolute value of a residual coefficient, may be encoded. A method of selecting a method in which an absolute value of a residual coefficient is encoded will be described after.

After encoding size information of a residual coefficient, sign_flag, a flag representing a sign of a residual coefficient, may be encoded s1030. When a value of a flag, sign_flag, is 0, it represents that a residual coefficient is a positive number. On the other hand, when a value of a flag, sign_flag, is 1, it represents that a residual coefficient is a negative number.

Table 1 represents a value assigned to each syntax when a value of a residual coefficient is −21 and 2 gt_N_flags are used.

TABLE 1

| Division | Formula | Value |
|---|---|---|
| Residual Coefficient (Coeff) | coeff | −21 |
| sig_flag | coeff != 0 | 1 |
| gt_1_flag | !! (\|coeff\|−1) | 1 |
| par_flag | (\|coeff\|−2) & 1 | 1 |
| gt_2_flag | (\|coeff\|−2) >> 1 | 1 |
| rem_level | (\|coeff\|−4) >> 1 | 8 |
| sign_flag | | 1 |

In Table 1, coeff represents a value of a residual coefficient and 'Formula' represents a formula used to derive a value of each syntax.

Table 2 represents a value assigned to each syntax when a value of a residual coefficient is −21 and 5 gt_N_flags are used.

TABLE 2

| Division | Formula | Value |
|---|---|---|
| Residual Coefficient (Coeff) | coeff | −21 |
| sig_flag | coeff != 0 | 1 |
| gt_1_flag | !! (\|coeff\|−1) | 1 |
| par_flag | (\|coeff\|−2) & 1 | 1 |
| gt_2_flag | \|coeff\| >= 4 | 1 |
| gt_3_flag | \|coeff\| >= 6 | 1 |
| gt_4_flag | \|coeff\| >= 8 | 1 |
| gt_5_flag | \|coeff\| >= 10 | 1 |
| rem_level | (\|coeff\|−10) >> 1 | 5 |
| sign_flag | | 1 |

Figure 17:
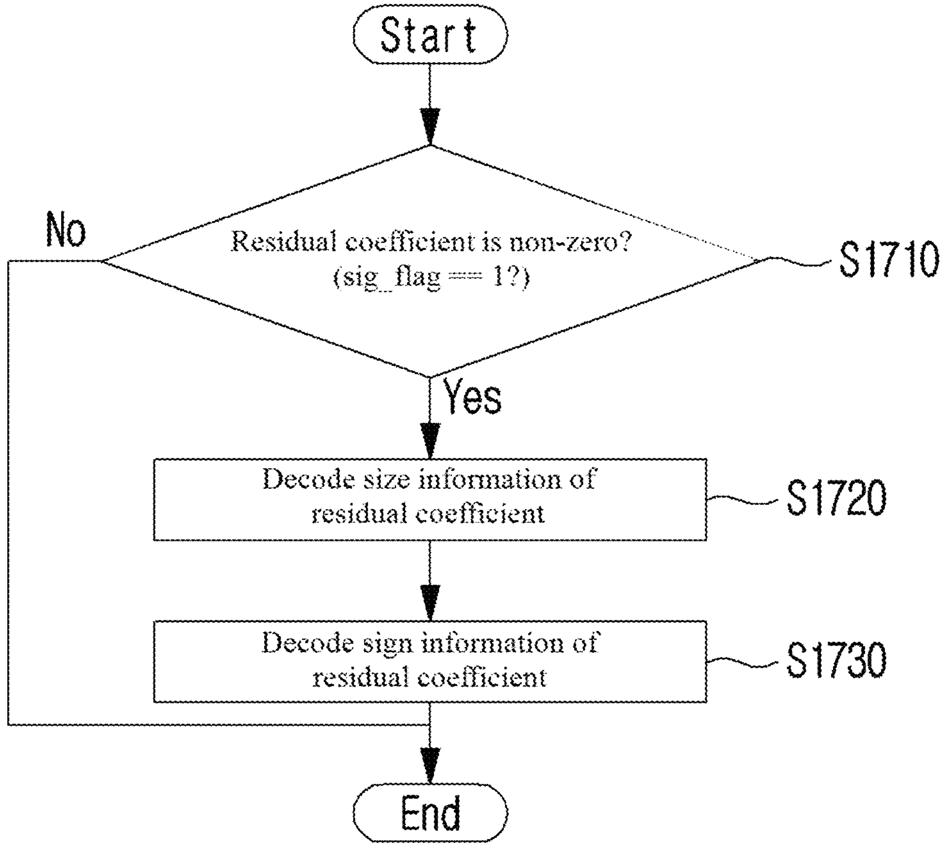
FIG. 17 is a flow chart representing a process of decoding a residual coefficient in an decoder.

FIG. 17 is a flow chart representing a process of decoding a residual coefficient in a decoder.

When it is determined that a non-zero residual coefficient is included in a sub-block, residual coefficients may be reconstructed based on predetermined scan order.

First, sig_flag, a flag representing whether a residual coefficient has a non-zero value, may be decoded S1710. When a value of a flag, sig_flag, is 0, it represents that a value of a residual coefficient is 0. On the other hand, when a value of a flag, sig_flag, is 1, it represents that a value of a residual coefficient is not 0. When a value of a flag, sig_flag, is 1, size information of a residual coefficient may be further decoded S1720.

Figure 18:
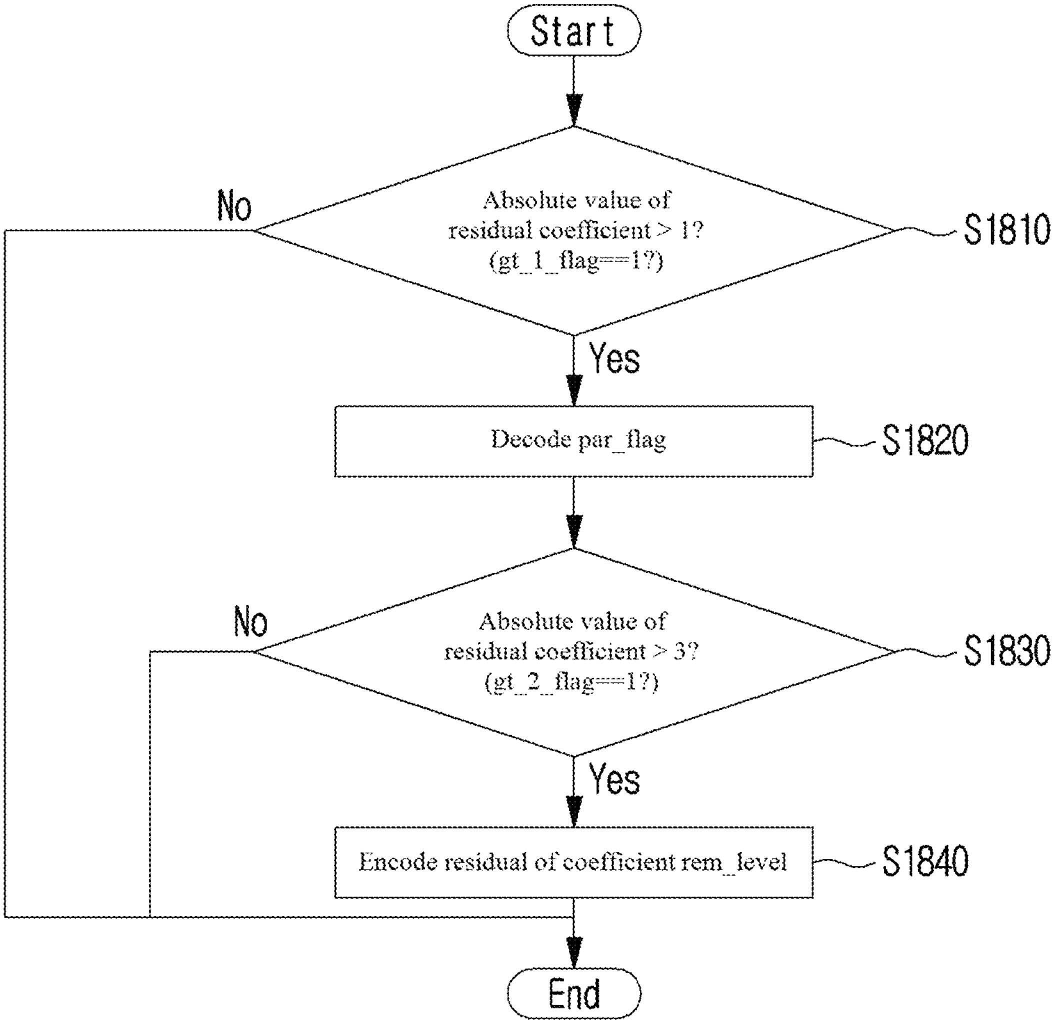
FIG. 18 is a diagram representing a process of decoding size information of a residual coefficient.

FIG. 18 is a diagram representing a process of decoding size information of a residual coefficient.

For convenience of a description, it is assumed that a residual coefficient is encoded by using up to 2 gt_N_flags.

gt1_flag, a flag representing whether an absolute value of a residual coefficient is greater than 1, may be decoded S1810. When a value of a flag, gt_1_flag, is 0, it represents that an absolute value of a residual coefficient is 1. On the other hand, when a value of a flag, gt_1_flag, is 1, it represents that an absolute value of a residual coefficient is greater than 1.

When a value of a flag, gt_1_flag, is 1, par_flag, a flag representing whether an absolute value of a residual coefficient is an even number or an odd number, may be decoded S1820. When a value of a flag, par_flag, is 0, it represents that an absolute value of a residual coefficient is an even number and when a value of a flag, par_flag, is 1, it represents that an absolute value of a residual coefficient is an odd number.

Next, gt_2_flag, a flag representing whether an absolute value of a residual coefficient is greater than 3, may be decoded S1830. When a value of a flag, gt_2_flag, is 0, it represents that an absolute value of a residual coefficient is smaller than 3. When a value of a flag, gt_2_flag, is 0, an absolute value of a residual coefficient may be determined as 2 or 3 according to a value of a flag, par_flag.

When a value of a flag, gt_2_flag, is 1, it represents that an absolute value of a residual coefficient is greater than 3.

When a value of a flag, gt_2_flag, is 1, rem_level representing a residual size may be decoded S1840. An absolute value of a residual coefficient may be derived by adding 3 or 4 to a value derived by shifting a value representing a syntax, rem_level, by 1 to the left.

Besides a flag, gt_1_flag and gt_2_flag, shown in FIG. 18, gt_N_flag such as gt_3_flag, gt_4_flag or gt_5_flag, etc. may be additionally decoded. In this case, when a value of gt_(N−1)_flag is 1, gt_N_flag may be additionally decoded.

gt_N_flag may represent whether an absolute value of a residual coefficient has a value greater than (2N−1). When gt_N_flag is additionally used, rem_level may be set as a value derived by shifting a value derived by subtracting 2N from an absolute value of a residual coefficient by 1 to the right.

In the above-described example, it was illustrated that an absolute value of a residual coefficient is decoded by using sig_flag, gt_1_flag, par_flag, gt_2_flag and rem_level. In another example, an absolute value of a residual coefficient may be decoded as it is. In an example, abs_level, a syntax representing an absolute value of a residual coefficient, may be decoded. A method of selecting a method in which an absolute value of a residual coefficient is decoded will be described after.

After decoding size information of a residual coefficient, sign_flag, a flag representing a sign of a residual coefficient, may be decoded S1230. When a value of a flag, sign_flag, is 0, it represents that a residual coefficient is a positive number. On the other hand, when a value of a flag, sign_flag, is 1, it represents that a residual coefficient is a negative number.

Table 3 represents an example in which a residual coefficient whose value is −21 is decoded by using 2 gt_N_flags.

TABLE 3

| Division | Value | Formula |
|---|---|---|
| sig_flag | 1 | — |
| gt_1_flag | 1 | — |
| par_flag | 1 | — |
| gt_2_flag | 1 | — |
| tmp_coeff | 5 | 1+gt_1_flag+par_flag+(gt_2_flag <<1) |
| rem_level | 8 | |
| sign_flag | 1 | sign = (sign_flag == 1 ? −1 : 1) |
| Residual Coefficient (coeff) | −21 | tmp_coeff + (rem_level<<1) * sign |

In Table 3, a variable, tmp_coeff, represents a temporary reconstructed coefficient. When a value of gt_2_flag is 0, a temporary reconstructed coefficient, tmp_coeff, may be set as an absolute value of a residual coefficient. On the other hand, when a value of gt_2_flag is 1, an absolute value of a residual coefficient may be derived by updating a temporary reconstructed coefficient, tmp_coeff, based on a syntax, rem_level.

Table 4 represents an example in which a residual coefficient whose value is −21 is decoded by using 5 gt_N_flags.

TABLE 4

| Division | Value | Formula |
|---|---|---|
| sig_flag | 1 | — |
| gt_1_flag | 1 | — |
| par_flag | 1 | — |
| tmp_coeff | 5 | 1+gt_1_flag+par_flag |
| gt_2_flag | 1 | tmp_coeff += (sig_2_flag <<1) |
| gt_3_flag | 1 | tmp_coeff += (sig_3_flag <<1) |
| gt_4_flag | 1 | tmp_coeff += (sig_4_flag <<1) |
| gt_5_flag | 1 | tmp_coeff += (sig_5_flag <<1) |
| rem_level | 5 | tmp_coeff += (rem_level << 1) |
| sign_flag | 1 | sign = (sign_flag == 1 ? −1 : 1) |
| Residual Coefficient (coeff) | −21 | tmp_coeff + (rem_level<<1) * sign |

In Table 3, a variable, tmp_coeff, represents a temporary reconstructed coefficient. When gt_N_flag is 0, a temporary reconstructed coefficient, tmp_coeff, may be set as an absolute value of a residual coefficient. On the other hand, when gt_N_flag is 1, a temporary reconstructed coefficient may be updated (e.g., tmp_coeff+=sig_N_flag<<1) and a next syntax may be parsed.

As described, a residual coefficient may be encoded by at least one syntax. A residual coefficient may be changed into a plurality of bins in a binarization process of syntax(es) and changed bins may be encoded by entropy encoding.

Entropy encoding may be divided into encoding using context information and encoding not using context information. Context represents a probability that a value of a bin is 0 or 1.

A threshold value may be set to limit the number of bins which are encoded by using context information. For a bin whose count value is smaller than a threshold value among generated bins, encoding using context information is performed. When a count value is equal to or greater than a threshold value, encoding using context information may not be used anymore.

A threshold value may be determined based on the number of non-zero residual coefficients in a current block. In an example, a value multiplying the number of non-zero residual coefficients in a current block by a real number or a value adding or subtracting an offset may be set as a threshold value.

Alternatively, a threshold value may be determined based on the number of pixels included in a current block. In an example, a value multiplying the number of pixels in a current block by a real number or a value adding or subtracting an offset may be set as a threshold value.

Alternatively, information representing a threshold value may be signaled in a bitstream. The information may be encoded through a higher header such as a sequence, a picture header or a slice header.

Alternatively, a threshold value may be determined based on at least one of a size or a shape of a current block.

Alternatively, a threshold value may be determined based on at least one of whether transform skip is applied, a transform kernel applied to a current block or a quantization parameter.

When the number of bins encoded by using context information is counted, a counter may be set not to operate when encoding information representing a position of a last non-zero residual coefficient. In other words, the information may be excluded from counting.

Alternatively, when encoding a flag representing whether there is a non-zero residual coefficient per sub-block in a current block, a counter may be set not to operate. In other words, the flag may be excluded from counting.

According to an embodiment of the present disclosure, in order to limit the number of bins encoded by using context information, when the number of bins encoded by using context information is equal to or greater than a threshold value, an absolute value of a residual coefficient may be encoded as it is instead of encoding a residual coefficient sequentially by using such gt_N_flag, etc. In an example, when the number of bins encoded by using context information is smaller than a threshold value, an absolute value of a residual coefficient may be encoded by using at least one of sig_flag, sign_flag, gt_1_flag, par_flag, gt_2_flag, gt_3_flag, gt_4_flag, gt_5_flag or rem_level illustrated in Table 1 to Table 4. On the other hand, when the number of bins encoded by using context information is equal to or greater than a threshold value, abs_level, a syntax representing an absolute value of a residual coefficient, may be encoded.

A decoder may also operate a counter whenever a bin encoded by using context information is decoded. When a value of a counter is smaller than a threshold value, an absolute value of a residual coefficient may be reconstructed by using at least one of sig_flag, sign_flag, gt_1_flag, par_flag, gt_2_flag, gt_3_flag, gt_4_flag, gt_5_flag or rem_level. On the other hand, when a value of a counter is equal to or greater than a threshold value, an absolute value of a residual coefficient may be reconstructed by using a syntax, abs_level.

Figure 19:
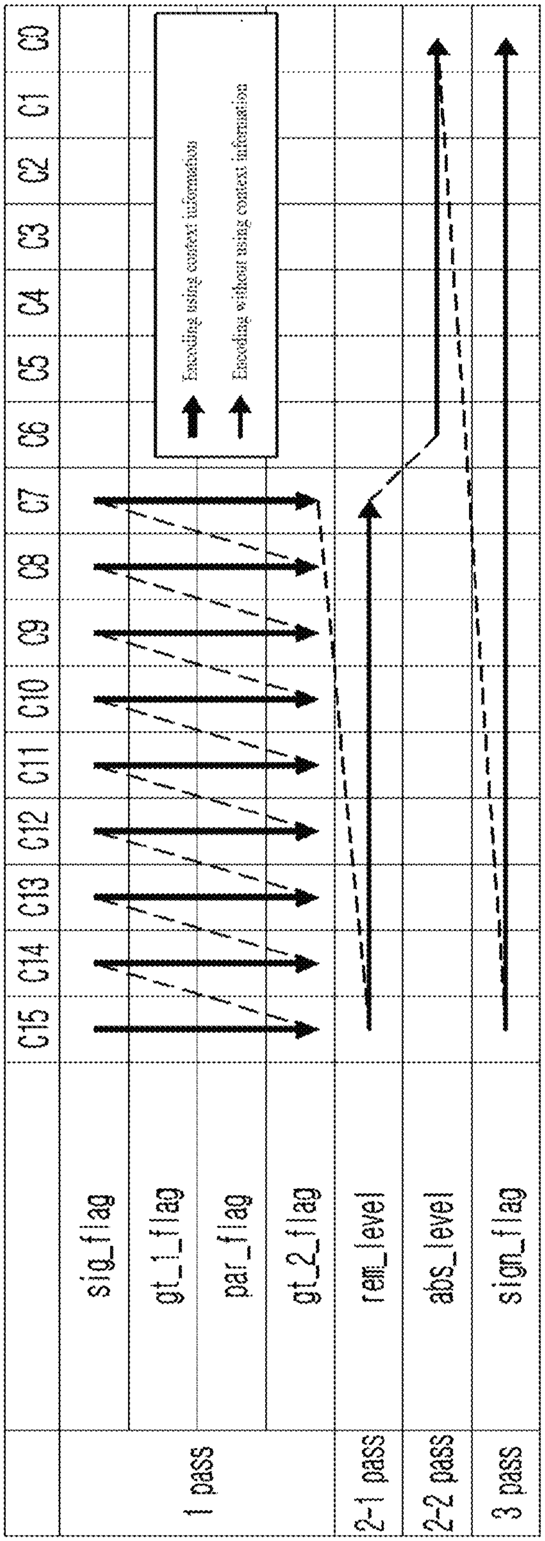
FIGS. 19 and 20 are a diagram representing an example in which the number of bins using context information is counted.

FIG. 19 is a diagram representing an example in which the number of bins using context information is counted.

For convenience of a description, it is assumed that there are 16 residual coefficients in a sub-block and it is assumed that each of coefficients is C0 to C15. Here, C15 means a residual coefficient at a bottom-right position in a sub-block and C0 means a residual coefficient at a top-left position in a sub-block.

In addition, residual coefficients are generated through transform and accordingly, it is assumed that scan order is determined in order of C15-C0.

In addition, it is assumed that the maximum number of bins encoded by using context information is 36 and it is assumed that a flag representing whether there is a non-zero residual coefficient in a sub-block and information representing a position of a last non-zero residual coefficient are excluded from counting.

In FIG. 19, 1 pass represents syntaxes encoded by using context information. 2-1, 2-2 and 3 pass excluding 1 pass represent syntaxes encoded without using context information.

Pass represents encoding and decoding order. In an example, in a decoder, syntaxes belonging to 2-1 pass may be decoded after decoding all syntaxes belonging to 1 pass. In addition, syntaxes belonging to 3 pass may be decoded after decoding all syntaxes belonging to 2-1 pass.

In a shown example, 2-2 pass represents an alternate path of 1 pass, 2-1 pass and 3 pass.

When a coefficient of a bin encoded by using context information is smaller than a threshold value, an absolute value of a residual coefficient may be encoded through 1 pass and 2-1 pass. On the other hand, when a coefficient of a bin encoded by using context information is equal to or greater than a threshold value, an absolute value of a residual coefficient may be encoded through 2-2 pass.

In an example, when first residual coefficient C15 is −21, as in an example shown in Table 2, a flag, sig_flag, gt_1_flag, par_flag, gt_2_flag and rem_level, may be encoded. As syntaxes (i.e., sig_flag, gt_1_flag, par_flag, gt_2_flag) encoded by using context information are encoded by using a total of 4 bins in encoding first residual coefficient C15, a counter increases to 4.

As a counter value is smaller than a threshold value 36 after encoding first residual coefficient C15, syntaxes encoded by using context information may be also used for second residual coefficient C14. When it is assumed that 4 syntaxes encoded by using context information are used for each of C15 to C7, a counter value is set as 36 equal to a threshold value after encoding an absolute value of residual coefficient C7.

Accordingly, when encoding next residual coefficient C6, an absolute value of residual coefficient C6 may be encoded as it is through a syntax, abs_level, without using syntaxes encoded by using context information. In other words, for residual coefficient C6 to C0, an absolute value of a residual coefficient may be encoded by using abs_level, a syntax belonging to 2-2 pass, instead of 4 syntaxes belonging to 1 pass (i.e., sig_flag, gt_1_flag, par_flag, gt_2_flag) and rem_level, a syntax belonging to 2-1 pass.

In this case, although the number of bins encoded by using context information is smaller than a threshold value, abs_level may be set to be encoded without using context information when a difference between the number and a threshold value is smaller than the maximum number of syntaxes set to be encoded by using context information. For example, when sig_flag, gt_1_flag, par_flag and gt_2_flag are set to be encoded by using context information, the syntaxes may be encoded only when a difference between the number and a threshold value is greater than 4. On the other hand, when the difference is smaller than 4, abs_level may be encoded.

In a shown example, it was shown that only 4 syntaxes belonging to 1 pass are encoded by using context information. Unlike a described example, at least one of rem_level, a syntax belonging to 2-1 pass, or sign_flag, a syntax belonging to 3 pass, may be encoded by using context information. In an example, when rem_level is encoded by using context information, the counter may be increased as many as the number of bins assigned to a syntax, rem_level.

In an example shown in FIG. 19, a flag, par_flag, may be set not to be encoded by using context information. Table 20 represents an example therefor.

Figure 20:
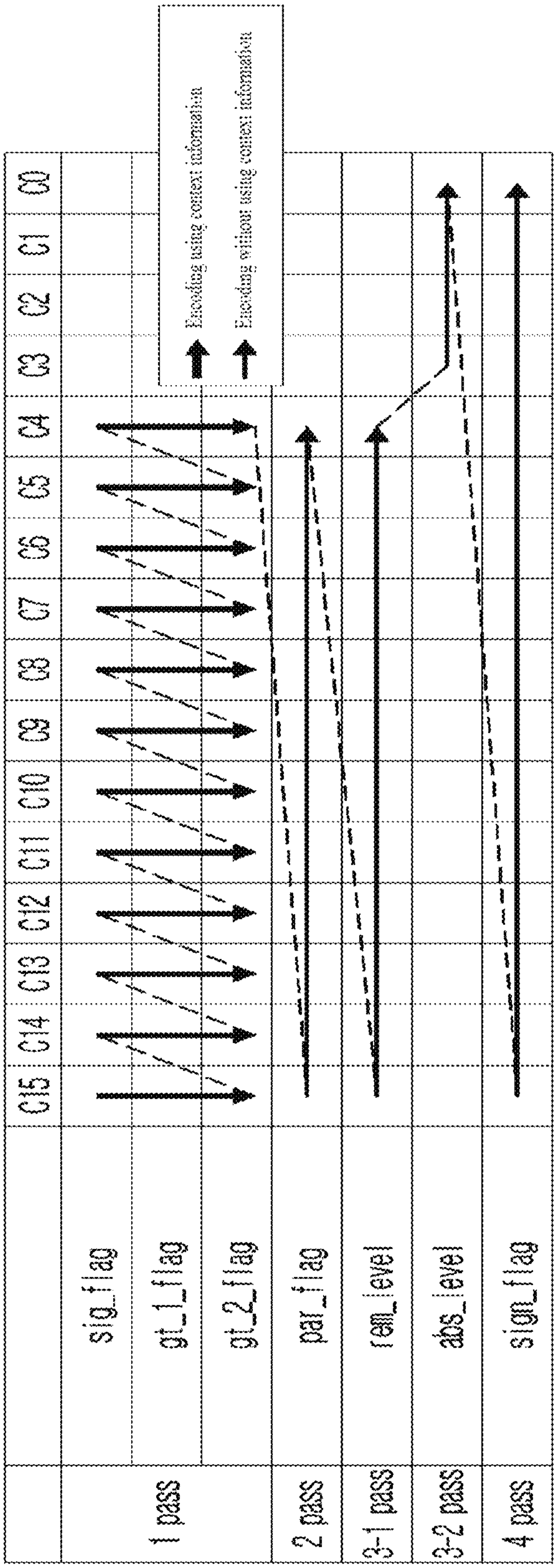

In FIG. 20, 1 pass represents syntaxes encoded by using context information. 2, 3-1, 3-2 and 4 pass excluding 1 pass represent syntaxes encoded without using context information. When a coefficient of a bin encoded by using context information is smaller than a threshold value, an absolute value of a residual coefficient may be encoded through 1 pass, 2 pass and 3-1 pass. On the other hand, when a coefficient of a bin encoded by using context information is equal to or greater than a threshold value, an absolute value of a residual coefficient may be encoded through 3-2 pass.

When a flag, par_flag, is set to be encoded without using context information, a counter may be set not to increase for the number of bins (i.e., 1) assigned to a flag, par_flag.

Accordingly, for each residual coefficient, a counter increases only for a bin assigned to 3 syntaxes, sig_flag, gt_1_flag and gt_2_flag.

When it is assumed that syntaxes, sig_flag, gt_1_flag and gt_2_flag, are encoded for each of residual coefficient C15 to C4, a counter is set as 36 equal to a threshold value after encoding syntaxes for residual coefficient C4.

Accordingly, when encoding residual coefficient C3, an absolute value of residual coefficient C3 may be encoded as it is through abs_level, a syntax included in 3-2 pass. In other words, for residual coefficient C3 to C0, an absolute value of a residual coefficient may be encoded by using abs_level, a syntax belonging to 3-2 pass, instead of syntaxes belonging to 1 pass and 2-1 pass.

A priority may be set between syntaxes encoded by using context information. In this case, after counting the number of bins assigned to syntaxes with a high priority, the number of bins assigned to syntaxes with a low priority may be counted.

Figure 21:
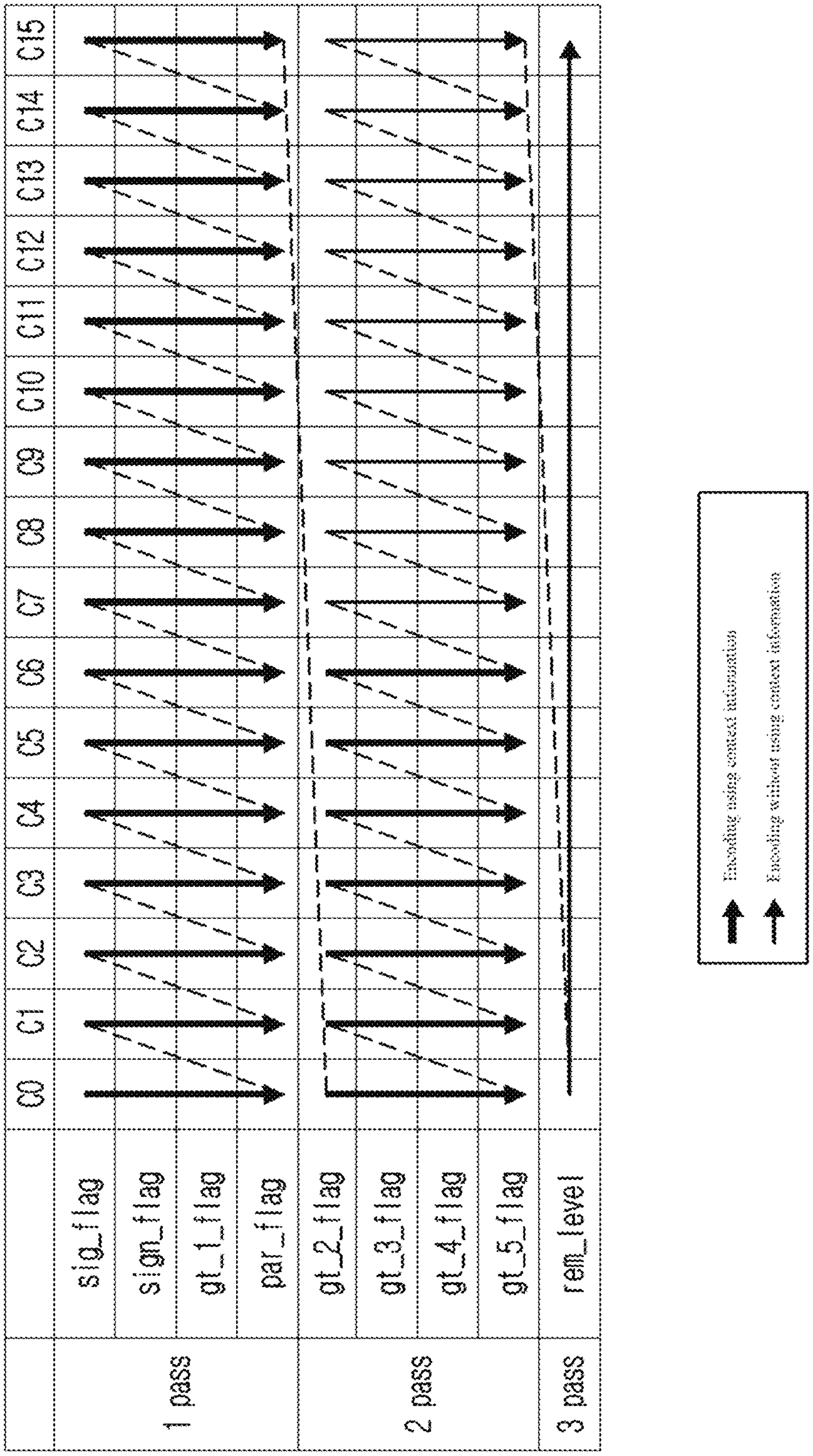
FIGS. 21 to 23 represent an example in which a priority between syntaxes encoded by using context information is different.

FIG. 21 represents an example in which a priority is different between syntaxes encoded by using context information.

Transform is skipped in a current block and accordingly, it is assumed that scan order is determined in order of C0-C15.

In an example in FIG. 21, syntaxes belonging to 1 pass and 2 pass may be encoded by using context information. In this case, when syntaxes belonging to 1 pass have a higher priority than syntaxes belonging to 2 pass, the number of bins assigned to syntaxes belonging to 2 pass may be counted after counting the number of bins assigned to syntaxes belonging to 1 pass when the number of bins encoded by using context information is counted.

In an example, when it is assumed that 16 residual coefficients are encoded and a threshold value is 96, a value of a counter is set as 64 after encoding syntaxes belonging to 1 pass for all of 16 residual coefficients. As a value of a counter is smaller than a threshold value, syntaxes belonging to 2 pass may be also encoded by using context information.

In a shown example, a value of a counter is set as 96 after encoding syntaxes belonging to 2 pass for residual coefficient C7. Accordingly, syntaxes belonging to 2 pass for next residual coefficient C8 may be encoded without using context information.

Figure 22:
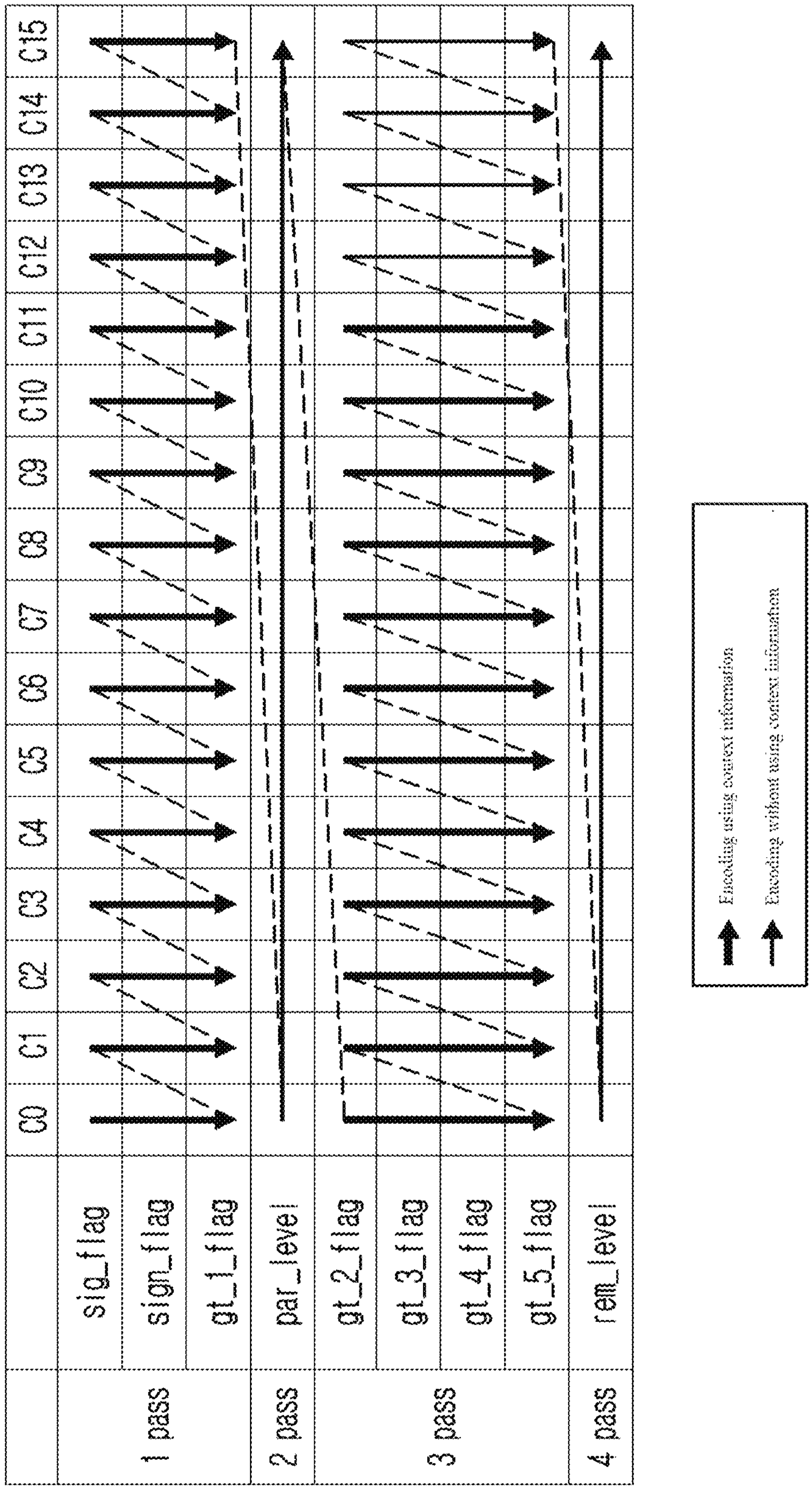

In an example shown in FIG. 21, a flag, par_flag, may be set not to be encoded by using context information. FIG. 22 represents an example therefor.

In FIG. 22, 1 pass and 3 pass represent syntaxes encoded by using context information. 2 pass and 4 pass represent syntaxes encoded without using context information.

A flag, par_flag, may be encoded without using context information. Accordingly, when encoding a flag, par_flag, a counter may be set not to increase. A value of a counter is set as 96 equal to a threshold value after encoding syntaxes belonging to 3 pass for residual coefficient C11. Accordingly, from next residual coefficient C12, context information may not be used when encoding syntaxes belonging to 3 pass.

In FIGS. 21 and 22, it was shown that gt_N_flags are dispersedly assigned in a different pass. In an example, in an example shown in FIG. 21, it was illustrated that while gt_1_flag belongs to 1 pass, gt_2_flag belongs to 2 pass.

It is also possible to set distribution of syntaxes to be different from FIG. 21 and FIG. 22. In an example, all gt_N_flags may be assigned to a single pass or gt_1_pass and gt_2_pass may be assigned to a single pass.

Figure 23:
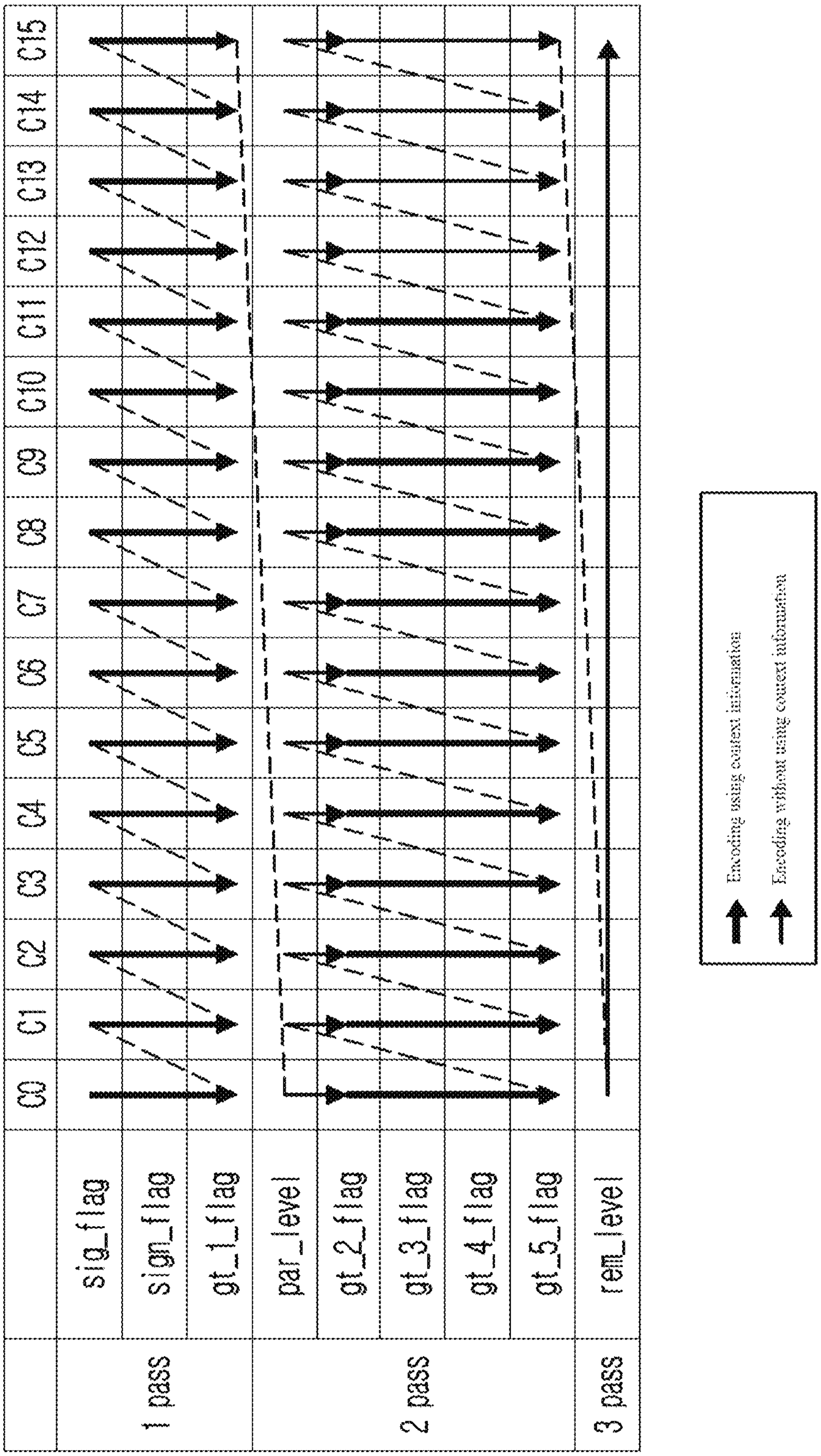

Instead of setting a flag, par_flag, as a separate pass, par_flag may be set as the same pass as gt_1_flag or gt_2_flag, but it may be set not to use context information when encoding a flag, par_flag. FIG. 23 represents an example therefor. In an example shown in FIG. 23, it was shown that a flag, par_flag, is assigned to the same pass as gt_2_flag, gt_3_flag, gt_4_flag and gt_5_flag.

A flag, par_flag, may be assigned to a lower pass than gt_N_flag. In an example, in an example shown in FIG. 22, 2 pass including par_flag may be changed into 3 pass and the existing 3 pass may be changed into 2 pass. In this case, syntaxes not using context information may be encoded after encoding syntaxes using context information first.

It is possible to combine par_flag and rem_level into 3 pass and encode them.

As in the above-described example, an absolute value of a residual coefficient may be encoded by using at least one of sig_flag, par_flag, gt_N_flag or rem_level. In this case, residual syntaxes excluding rem_level may be encoded by referring to a variety of context information according to a feature of surrounding coefficients. In an example, sig_flag, a flag representing whether a residual coefficient is 0 or not, may be encoded by referring to a variety of context information according to a feature of surrounding residual coefficients. In this case, the number of referenceable context information may be determined according to a position of a pixel.

Figure 24:
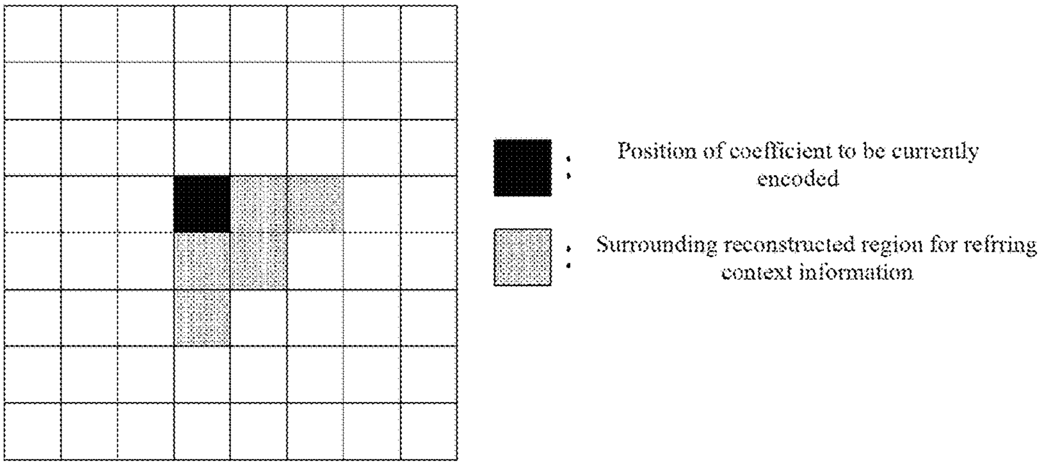
FIGS. 24 and 25 represent a surrounding reconstructed region referenced to determine context information.
Figure 25:
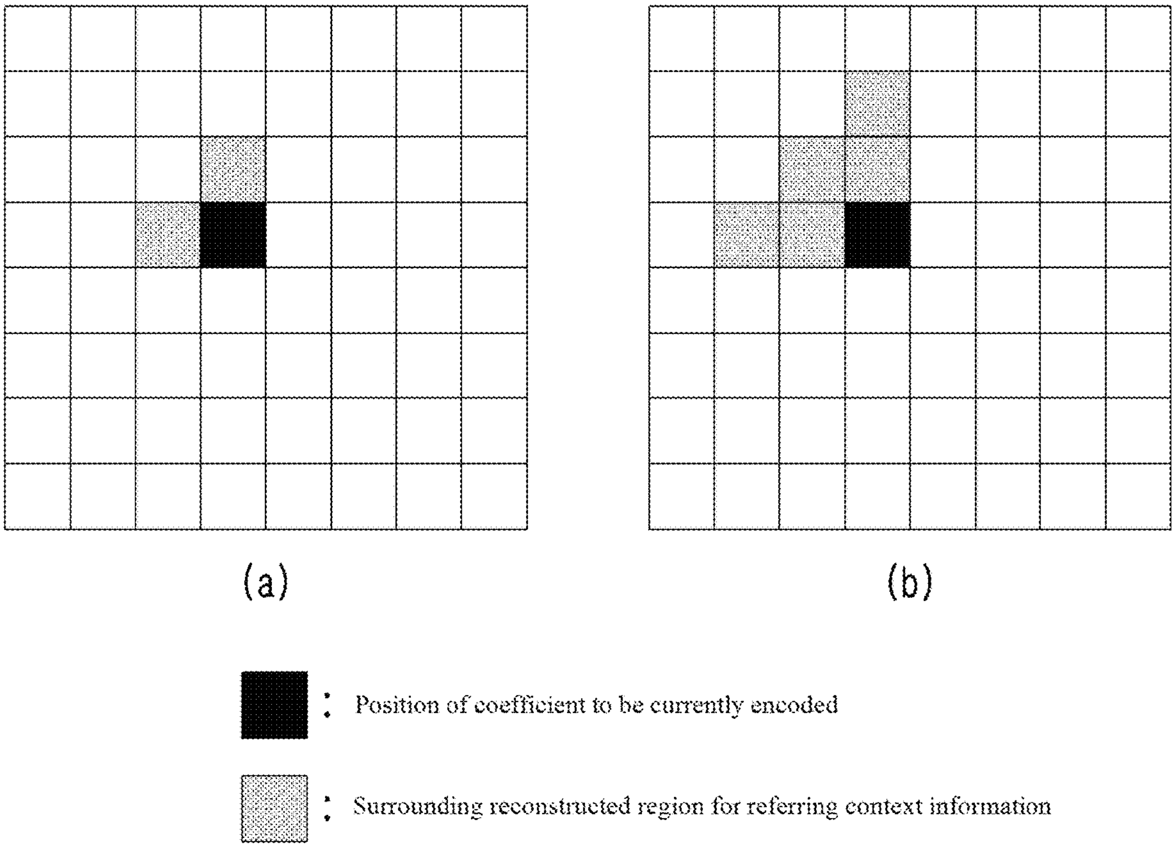

FIGS. 24 and 25 represent a surrounding reconstructed region referenced to determine context information.

FIG. 24 is an example on a case in which a residual coefficient is encoded in scan order from a bottom-right residual coefficient to a top-left residual coefficient. In an example, FIG. 24 may be applied to a case in which transform is not skipped in a current block.

FIG. 25 is an example on a case in which a residual coefficient is encoded in scan order from a top-left residual coefficient to a bottom-right residual coefficient. In an example, FIG. 25 may be applied to a case in which transform is skipped in a current block.

Referring to an example in FIGS. 24 and 25, up to 2 or up to 5 reconstructed coefficients may be referenced. In an example, when a position of a residual coefficient is (x, y), a region including reconstructed coefficients that an absolute value of a sum of an x-coordinate difference and a y-coordinate difference with a residual coefficient is equal to or less than 1 or a region including reconstructed coefficients that the absolute value is equal to or less than 2 may be set as a surrounding reconstructed region.

Alternatively, when there is a reconstructed coefficient which is not reconstructed yet in scan order or which is out of a block boundary among reconstructed coefficients in a reconstructed region with a residual coefficient, the unavailable reconstructed coefficient may be excluded from reference.

Alternatively, for an unavailable reconstructed coefficient, context information may be selected by considering information of a corresponding position as a default value. In an example, as in an example shown in FIG. 25(*a*), when a reconstructed region is set and a residual coefficient to be currently encoded is included in a leftmost column in a current block, a sig_flag value of a left reconstructed coefficient of a current residual coefficient may be inferred to 0 or 1.

Alternatively, when a reconstructed coefficient out of a block boundary is included in a sub-block different from a current residual coefficient, but is included in the same coding block, a corresponding reconstructed coefficient may be set to be available.

It is possible to determine context information by referring to more or less reconstructed coefficients than those in a shown example. In an example, it was not shown in FIG. 24, but only a reconstructed coefficient at a right position of a residual coefficient and a reconstructed coefficient at a bottom position may be used to determine context information.

Alternatively, after an index is assigned to each of a plurality of reconstructed region candidates, an index specifying one of them may be encoded and transmitted to a decoder. Alternatively, a reconstructed region may be adaptively determined according to a size or a shape of a current block. Alternatively, a reconstructed region may be determined based on quantization state information, QState. In an example, when a variable, QState is 0 or 1, a reconstructed region including up to 2 reconstructed coefficients may be used. Alternatively, when QState is 2 or 3, a reconstructed region including up to 5 reconstructed coefficients may be used.

Alternatively, it may be set to refer to one of N fixed context information instead of setting a surrounding reconstructed region. In an example, N may be 1. Alternatively, a value of N may be determined according to a position of a residual coefficient. In an example, when a sum of x and y is less than a threshold value, N may be set as 1 and when a sum of x and y is equal to or greater than a threshold value, N may be set as 2. A threshold value may be transmitted to an encoder through a higher header. Alternatively, a threshold value may be pre-promised in an encoder and a decoder.

When encoding/decoding sig_flag, a value of sig_flag of reconstructed coefficients included in a reconstructed region around a residual coefficient may be summed.

Alternatively, an absolute value of a reconstructed coefficient or a partially reconstructed coefficient included in a reconstructed region around a residual coefficient may be calculated. Here, an absolute value of a partially reconstructed coefficient may mean a temporary reconstructed coefficient derived based on syntaxes included in 1 pass, e.g., (sig_flag+gt_1_flag+par_flag+(gt_2_flag<<1)).

One of a plurality of context information may be specified by using a derived value.

Figure 26:
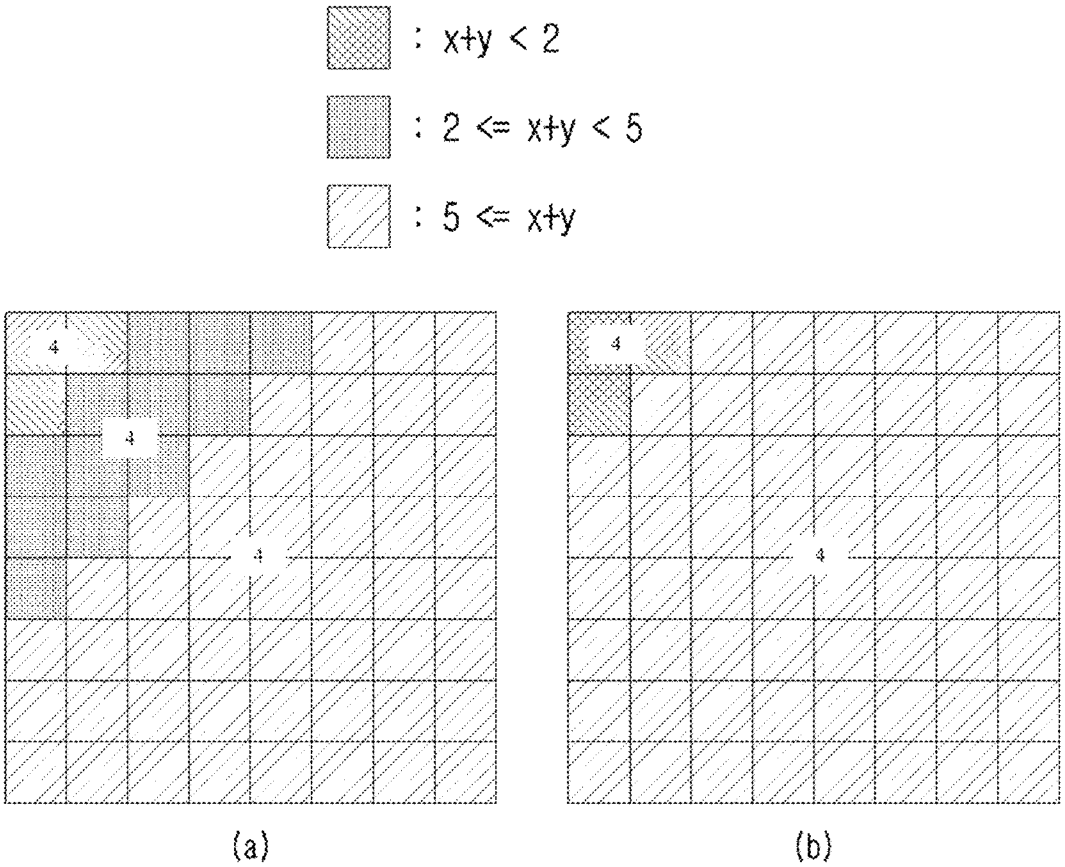
FIG. 26 illustrates the number of context information which may be referenced when encoding a flag, sig_flag.

FIG. 26 illustrates the number of context information which may be referenced when encoding a flag, sig_flag.

FIG. 26(*a*) is an example for a luma component and FIG. 26(*b*) is an example for a chroma component.

A current block may be partitioned into a plurality of regions and a type of referenceable context information per each region may be set differently. In an example, a type of referenceable context information may be different in each of a first region where a sum of an x and y-coordinate is smaller than 2, a second region where a sum of an x and y-coordinate is equal to or greater than 2 and less than 5 and a third region where a sum of an x and y-coordinate is equal to or greater than 5.

In addition, the number of referenceable context information in each region may be different. In an example, the number of referenceable context information in each region may be fixed.

Alternatively, the number of referenceable context information in each region may be different. In an example, the number of referenceable context information may be different in each of a first region where a sum of an x and y-coordinate is smaller than 2, a second region where a sum of an x and y-coordinate is equal to or greater than 2 and less than 5 and a third region where a sum of an x and y-coordinate is equal to or greater than 5.

In another example, a type of referenceable context information may be set differently according to quantization state information. QState, a variable representing quantization state information, may have a value of 0 to 3. In an example, while type 1 context information may be referenced when a variable, QState, is 0 and 1, type 2 context information may be referenced when QState is 2 and type 3 context information may be referenced when QState is 3.

In an example shown in FIG. 26(*a*), it was illustrated that a luma block is divided into 3 regions and the number of referenceable context information per each region is 4. When it is assumed that 3 types of context information are available according to quantization state information, a total of 36 (3×4×3) context information in a luma block may be set to be referenceable.

In an example shown in FIG. 26(*b*), it was illustrated that a chroma block is divided into 2 regions and the number of referenceable context information per each region is 4. When it is assumed that 3 types of context information are available according to quantization state information, a total of 24 (2×4×3) context information in a chroma block may be set to be referenceable.

According to a size of a reconstructed region (i.e., the number of reconstructed coefficients included in a reconstructed region), the number of referenceable context information may be set differently.

Alternatively, the number of referenceable context information may be different according to whether transform skip is applied to a current block. In an example, while 3 or 5 context information may be referenced when transform skip is applied to a current block, 4 context information may be referenced when transform is applied to a current block.

When a sum of values of sig_flag of surrounding reconstructed coefficients is used, a derived sum may be compared with a threshold value. Here, a threshold value may be set the same as the number of referenceable context information. According to the number of reconstructed coefficients included in a reconstructed region, a sum may be in a range of 0~2 or 0~5. When a sum is greater than a threshold value, the sum may be converted into the threshold value. In an example, when a sum is 5 and a threshold value is 4, a sum may be changed into 4. Subsequently, one of a plurality of context information may be specified based on a sum. In other words, a sum may be used as an index specifying one of a plurality of context information.

In case that a sum of absolute values of surrounding reconstructed coefficients is used, after calculating a sum of absolute values of reconstructed coefficients in a surrounding reconstructed region, the derived value may be divided by a predefined value. For example, a predefined value may be a natural number such as 2, 3, 4 or 5. Alternatively, a sum of absolute values may be divided by the number of reconstructed coefficients in a surrounding reconstructed region.

A result value derived by the division operation may be compared with a threshold value. In this case, when a result value is greater than a threshold value, a derived value may be converted into a threshold value. In an example, when a threshold value is 3 and the result value is greater than 3, a result value may be converted into 3. Accordingly, a result value may be set as a value from 0 to 3.

According to a result value, context information which should be referenced when encoding/decoding a corresponding residual coefficient may be specified. In other words, the result value may be used as an index specifying one of a plurality of context information. Accordingly, a threshold value may be determined based on the number of referenceable context information in a region where a residual coefficient is included.

A residual coefficient may be encoded/decoded by using simplified context information. In an example, when a variable, QState, is 0 or 1, the number of referenceable context information may be 4. On the other hand, when a variable, QState, is 2 or 3, the number of referenceable context information may be 2.

Alternatively, the referenceable number per region may be set differently. In an example, when a variable, QState, is 2 or 3, the number of referenceable context information is set as 4 in a third region, while the number of referenceable context information is set as 2 in a first and second region.

When the number of referenceable context information is 2 in encoding/decoding a residual coefficient, a threshold value may be set as 1. In this case, a result value has a value of 0 or 1, so one of 2 context information may be specified by the result value.

Alternatively, when the number of referenceable context information is 2, context information may be specified based on whether a value derived by a modulo operation with 2 and a sum of absolute values of reconstructed coefficients in a surrounding reconstructed region is 0.

Even when gt_N_flag or par_flag is encoded/decoded, context information may be determined by referring to a surrounding reconstructed region.

Figure 27:
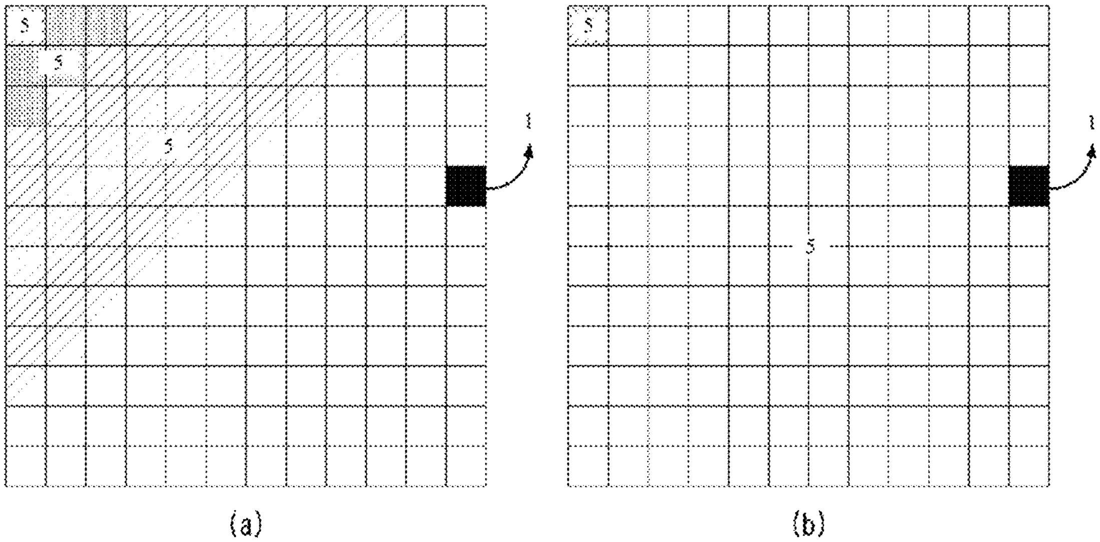
FIG. 27 illustrates the number of context information which may be referenced when encoding gt_N_flag or par_flag.

FIG. 27 illustrates the number of context information which may be referenced when encoding gt_N_flag or par_flag.

FIG. 27(*a*) illustrates a luma block and FIG. 27(*b*) illustrates a chroma block.

For a luma block, a block may be partitioned into a plurality of regions. In an example shown in FIG. 27(*a*), it was illustrated that a luma block is divided into a first region where a luma block includes a residual coefficient at a position of (0, 0), a second region where a sum of an x-axis and y-axis coordinate is equal to or greater than 1 and smaller than 3, a third region where a sum of an x-axis and y-axis coordinate is equal to or greater than 3 and smaller than 10 and a fourth region excluding a first to third region.

In this case, a last non-zero residual coefficient may be set as a fifth region. As a last non-zero residual coefficient is encoded/decoded first in scan order, only 1 context information may be set to be referenceable for a last non-zero residual coefficient.

A chroma block may have less number of partitioned regions than a luma block. In an example, in FIG. 27(*b*), it was illustrated that a chroma block is partitioned into a first region including a residual coefficient of (0, 0) and a second region excluding the first region.

In this case, it may be set as a third region which includes a last non-zero residual coefficient.

In an example shown in FIG. 27, it was illustrated that the number of referenceable context information in each region excluding a region including a last non-zero residual coefficient is 5. In this case, a type of referenceable context information per each region may be different. Accordingly, a total number of referenceable context information in a luma block may be 21(4×5+1) and a total number of referenceable context information in a chroma block may be 11(2×5+1).

As described above, the number and/or a type of referenceable context information may be set differently according to a region or quantization state information.

When encoding/decoding gt_N_flag or par_flag, at least one of a sum of absolute values of residual coefficients included in a surrounding reconstructed region and a sum of sig_flags may be derived. Subsequently, a result value derived by subtracting a sum of sig_flags from a sum of absolute values may be compared with a threshold value. In this case, when a result value is greater than a threshold value, a result value may be converted into a threshold value. In an example, when a threshold value is 4, a result value greater than 4 may be converted into 4. Accordingly, a result value is set as a value of 0 to 4. Based on the result value, one of 5 context information may be specified. In other words, the result value may be used as an index specifying one of a plurality of context information.

Context information which should be referenced may be determined by a simplified method. In an example, when a residual coefficient is encoded in each region, only one predefined context information may be referenced while omitting a process of deriving a sum of absolute values of reconstructed coefficients in a surrounding reconstructed region. A simplified method of determining context information may be applied to both of a luma block and a chroma block or may be applied to only one of a luma block and a chroma block.

In an example, while a method of specifying one of a plurality of context information may be used based on a result value in a luma block, a method of using predefined context information may be used in a chroma block.

A partitioning method of regions and the number of regions are not limited to a shown example. In an example, at least one of a partitioning method or the number may be determined by considering at least one of a size or a shape of a current block, whether transform skip is applied, or a position of a last non-zero residual coefficient. Alternatively, information specifying at least one of a partitioning method of regions of the number of regions in a current block may be signaled by being encoded through a higher header.

According to a size of a reconstructed region (i.e., the number of reconstructed coefficients), the number of referenceable context information may be set differently.

In an example, when context information is determined by using 5 reconstructed coefficients, one of up to 5 context information may be specified in encoding gt_N_flag or par_flag. On the other hand, when context information is determined by using 2 reconstructed coefficients, one of up to 3 context information may be specified. When the number of referenceable context information decreases, a threshold value may decrease together.

In addition, a size of a reconstructed region may be set differently per region or a size of a reconstructed region may be set differently per color component.

Alternatively, context information may be derived by comparing information of each reconstructed coefficient, instead of summing up information of each reconstructed coefficient in a surrounding reconstructed region. In an example, when encoding/decoding par_flag, it is assumed that a reconstructed region is set as shown in FIG. 27(*a*). In this case, for a left reconstructed coefficient and a top reconstructed coefficient of a residual coefficient, context information which should be referenced when encoding/decoding par_flag for a current residual coefficient may be determined by referring to par_flag of each reconstructed coefficient.

In an example, a case in which all par_flags are not encoded for a left and top reconstructed coefficient (i.e., a case in which at least one of sig_flag or gt_1_flag is 0 for each of a left and top reconstructed coefficient) or a case in which a value of par_flag of two reconstructed coefficients is different may be defined as a first case. A case in which all values of par_flag of two reconstructed coefficients are 1 may be defined as a second case, and a case in which all values of par_flag of two reconstructed coefficients are 0 may be defined a third case. When encoding par_flag of a current residual coefficient, it may be set to refer to different context information for each case. In other words, after assigning an index (from 0 to 2) to each case, one context information may be specified based on the index.

Syntaxes used in the above-described embodiments are just named for convenience of a description.

When embodiments described based on a decoding process or an encoding process are applied to an encoding process or a decoding process, it is included in a scope of the present disclosure. When embodiments described in a predetermined order are changed in an order different from a description, it is also included in a scope of the present disclosure.

The above-described embodiment is described based on a series of stages or flow charts, but it does not limit a time series order of the present disclosure and if necessary, it may be performed at the same time or in a different order. In addition, each component (e.g., a unit, a module, etc.) configuring a block diagram in the above-described embodiment may be implemented as a hardware device or a software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL APPLICABILITY

The present disclosure may be applied to an electronic device which may encode/decode an image.

What is claimed is:

1. A video decoding method comprising:

determining whether an inverse-transform is skipped for a current block;

in response to the inverse-transform being skipped for the current block, obtaining residual coefficients of the current block based on a pre-defined scanning order;

performing an inverse-quantization on the current block; and obtaining residual samples of the current block based on inverse-quantized residual coefficients of the current block, wherein in response to a remaining number of CCB (Context Coded Bin) is equal to or greater than a threshold value, at least one context-coded syntax in a first pass is decoded from a bitstream to obtain a residual coefficient of the current block, wherein in response to the remaining number of CCB is less than the threshold value, the residual coefficient of the current block is obtained by decoding remaining level information from the bitstream without decoding the at least one context-coded syntax in the first pass, wherein the at least one context-coded syntax in the first pass comprises at least one of a significant flag indicating whether the residual coefficient is not zero, a greater than 1 flag indicating whether an absolute value of the residual coefficient is greater than 1, a sign flag indicating whether the residual coefficient has a positive value or a negative value, or a parity flag indicating whether the absolute value of the residual coefficient is an odd number or an even number, wherein in response to an updated remaining number of CCB being equal to or greater than the threshold value, depending on whether the greater than 1 flag indicates that the absolute value of the residual coefficient is greater than 1, it is determined whether to decode at least one of context-coded syntax in a second pass or not, and wherein the remaining number of CCB is decreased by 1 from a maximum number of CCB each time a context-coded syntax is decoded.

2. The method of claim 1, wherein the greater than 1 flag is decoded from the bitstream only when the significant flag indicates that the residual coefficient is not zero.

3. The method of claim 1, wherein the threshold value is 4.

4. The method of claim 1, wherein the maximum number of CCB is determined based on a size of the current block.

5. The method of claim 1, wherein in response to the updated remaining number of CCB (Context Coded Bin) is equal to or greater than a threshold value, the at least one context-coded syntax in the second pass is decoded to obtain a residual coefficient of the current block, and wherein in response to the updated remaining number of CCB is less than the threshold value, the remaining level information for the residual coefficient is decoded without decoding the at least one context-coded syntax in the second pass.

6. The method of claim 5, wherein in response that the remaining level information for the residual coefficient is decoded without decoding the at least one context-coded syntax in the second pass, the absolute value of the current block is obtained by summing a value of the significant flag, the greater than 1 flag, the parity flag and twice of a value of the remaining level information.

7. The method of claim 1, wherein the at least one context-coded syntax in the second pass can be decoded after context-coded syntaxes in the first pass for all of the residual coefficients are decoded.

8. The method of claim 1, wherein at least one context-coded syntax in the second pass comprises:

a greater than 3 flag indicating whether the absolute value of the residual coefficient is greater than 3, a greater than 5 flag indicating whether the absolute value of the residual coefficient is greater than 5, a greater than 7 flag indicating whether the absolute value of the residual coefficient is greater than 7, and a greater than 9 flag indicating whether the absolute value of the residual coefficient is greater than 9.

9. The method of claim 1, wherein in response that the remaining level information for the residual coefficient is decoded without decoding the at least one context-coded syntax in the first pass, the absolute value of the current block is derived to be the same as a value of the remaining level information.

10. The method of claim 1, wherein the pre-defined scanning order is a diagonal scan from a top-left position of the current block to a top-right position of the current block.

11. A video encoding method comprising:

determining whether a transform is skipped for a current block;

quantizing transform coefficients, derived by skipping the transform, of the current block; and encoding residual coefficients resulting from the quantization, wherein in response to the transform being skipped for the current block, the residual coefficients are encoded based on a pre-defined scanning order, wherein in response to a remaining number of CCB (Context Coded Bin) is equal to or greater than a threshold value, at least one context-coded syntax in a first pass is encoded into a bitstream for a residual coefficient of the current block, wherein in response to the remaining number of CCB is less than the threshold value, remaining level information is encoded into the bitstream for the residual coefficient of the current block without encoding the at least one context-coded syntax in the first pass, wherein the at least one context-coded syntax in the first pass comprises at least one of a significant flag indicating whether the residual coefficient is not zero, a greater than 1 flag indicating whether an absolute value of the residual coefficient is greater than 1, a sign flag indicating whether the residual coefficient has a positive value or a negative value, or a parity flag indicating whether the absolute value of the residual coefficient is an odd number or an even number, wherein in response to an updated remaining number of CCB being equal to or greater than the threshold value, depending on whether the greater than 1 flag is encoded with a value indicating that that the absolute value of the residual coefficient is greater than 1, it is determined whether to encode at least one of context-coded syntax in a second pass or not, and wherein the remaining number of CCB is decreased by 1 from a maximum number of CCB each time a context-coded syntax is encoded.

12. The method of claim 11, wherein the greater than 1 flag is encoded into the bitstream only when the significant flag is encoded with a value indicating that the residual coefficient has is not zero.

13. The method of claim 11, wherein the threshold value is 4.

14. The method of claim 11, wherein the maximum number of CCB is determined based on a size of the current block.

15. A non-transitory computer readable recoding medium storing instructions that, when executed, cause a processor to perform a video encoding method, the video encoding method comprising:

determining whether a transform is skipped for a current block;

quantizing transform coefficients, obtained by skipping the transform, of the current block; and encoding residual coefficients output resulting from the quantization, wherein in response to the transform being skipped for the current block, the residual coefficients are encoded based on a pre-defined scanning order, wherein in response to a remaining number of CCB (Context Coded Bin) is equal to or greater than a threshold value, at least one context-coded syntax in a first pass is encoded into a bitstream for a residual coefficient of the current block, wherein in response to the remaining number of CCB is less than the threshold value, remaining level information is encoded into the bitstream for the residual coefficient of the current block without encoding the at least one context-coded syntax in the first pass, wherein the at least one context-coded syntax in the first pass comprises at least one of a significant flag indicating whether the residual coefficient is not zero, a greater than 1 flag indicating whether an absolute value of the residual coefficient is greater than 1, a sign flag indicating whether the residual coefficient has a positive value or a negative value, or a parity flag indicating whether the absolute value of the residual coefficient is an odd number or an even number, wherein in response to an updated remaining number of CCB being equal to or greater than the threshold value, depending on whether the greater than 1 flag is encoded with a value indicating that that the absolute value of the residual coefficient is greater than 1, it is determined whether to encode at least one of context-coded syntax in a second pass or not, and wherein the remaining number of CCB is decreased by 1 from a maximum number of CCB each time a context-coded syntax is encoded.

* * * * *